US012372899B2

(12) United States Patent
Fujii et al.

(10) Patent No.: US 12,372,899 B2
(45) Date of Patent: Jul. 29, 2025

(54) IMAGE FORMING APPARATUS

(71) Applicant: BROTHER KOGYO KABUSHIKI KAISHA, Nagoya (JP)

(72) Inventors: Yasumasa Fujii, Anjo (JP); Takashi Arakawa, Nagoya (JP); Shougo Sato, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/477,789

(22) Filed: Sep. 29, 2023

(65) Prior Publication Data

US 2024/0142894 A1 May 2, 2024

Related U.S. Application Data

(63) Continuation of application No. 17/735,233, filed on May 3, 2022, now Pat. No. 11,789,381, which is a continuation of application No. 16/993,590, filed on Aug. 14, 2020, now Pat. No. 11,333,998, which is a continuation of application No. 16/515,873, filed on Jul. 18, 2019, now Pat. No. 10,747,145.

(30) Foreign Application Priority Data

Jul. 30, 2018 (JP) ................................ 2018-142787

(51) Int. Cl.
*G03G 15/08* (2006.01)

(52) U.S. Cl.
CPC ..... *G03G 15/0886* (2013.01); *G03G 15/0872* (2013.01)

(58) Field of Classification Search
CPC ........................ G03G 15/0886; G03G 15/0872
See application file for complete search history.

(56) References Cited

U.S. PATENT DOCUMENTS

| | | | |
|---|---|---|---|
| 5,734,953 | A | 3/1998 | Tatsumi |
| 2003/0175051 | A1 | 9/2003 | Sato et al. |

(Continued)

FOREIGN PATENT DOCUMENTS

| | | | |
|---|---|---|---|
| JP | 2011-186067 A | 9/2011 |
| JP | 2012-137527 A | 7/2012 |
| JP | 2018-66817 A | 4/2018 |

OTHER PUBLICATIONS

Office Action issued in corresponding Japanese Patent Application No. 2018-142787, mailed Mar. 29, 2022.

*Primary Examiner* — G. M. A Hyder
(74) *Attorney, Agent, or Firm* — Merchant & Gould P.C.

(57) ABSTRACT

A drum cartridge is configured to be detachably mounted on an apparatus main body in a state where a toner cartridge is mounted on the drum cartridge. A first shutter and a second shutter are configured such that: when the drum cartridge is mounted onto the apparatus main body in a state where the toner cartridge is mounted on the drum cartridge, the first shutter moves from a first closed position to a first open position and the second shutter moves from a second closed position to a second open position, and when the drum cartridge is detached from the apparatus main body in a state where the toner cartridge is mounted on the drum cartridge, the first shutter moves from the first open position to the first closed position and the second shutter moves from the second open position to the second closed position.

12 Claims, 16 Drawing Sheets

(56) References Cited

U.S. PATENT DOCUMENTS

| | | | |
|---|---|---|---|
| 2006/0177241 A1 | 8/2006 | Sato et al. | |
| 2007/0223971 A1 | 9/2007 | Takagi | |
| 2008/0124105 A1 | 5/2008 | Okamoto et al. | |
| 2011/0052266 A1 | 3/2011 | Yoon et al. | |
| 2011/0217068 A1 | 9/2011 | Kamimura et al. | |
| 2012/0160717 A1 | 6/2012 | Sato | |
| 2015/0261173 A1 | 9/2015 | Sato | |
| 2017/0102640 A1 | 4/2017 | Sato | |
| 2018/0107153 A1 | 4/2018 | Sato et al. | |
| 2018/0284649 A1* | 10/2018 | Minoshima ........ | G03G 15/0806 |

* cited by examiner

IMAGE FORMING APPARATUS

REFERENCE TO RELATED APPLICATIONS

This application is a continuation of U.S. patent application Ser. No. 17/735,233, filed May 3, 2022, now U.S. Pat. No. 11,789,381, which is a continuation of U.S. patent application Ser. No. 16/993,590, now U.S. 11,223,998, filed Aug. 14, 2020, which is a continuation of U.S. patent application Ser. No. 16/515,873, now U.S. Pat. No. 10,747,145 filed Jul. 18, 2019, which claims priority from Japanese Patent Application No. 2018-142787 filed Jul. 30, 2018. The entire contents of the aforementioned applications are incorporated herein by reference.

BACKGROUND ART

Technical Field

This disclosure relates to an image forming apparatus.

Background

Conventionally, an image forming apparatus includes: a drawer which includes a photosensitive drum; a development unit which includes a development roller; and a toner cartridge which accommodates a toner. The drawer is configured to move between a mount position at which the drawer is mounted on the image forming apparatus and a drawn position at which the drawer is drawn from the image forming apparatus. The toner cartridge includes: a first housing having a discharge port for discharging the toner; and a first shutter configured to move between a first closed position at which the discharge port is closed and a first open position at which the discharge port is opened. The development unit includes: a second housing having a reception port for receiving the toner discharged from the discharge port; and a second shutter configured to move between a second closed position at which the reception port is closed and a second open position at which the reception port is opened. When the drawer on which the toner cartridge is mounted moves from the drawn position to the mount position, the first shutter moves from the first closed position to the first open position, and the second shutter moves from the second closed position to the second open position.

DESCRIPTION

Summary

According to one aspect, this specification discloses an image forming apparatus. The image forming apparatus includes an apparatus main body, a toner cartridge, and a drum cartridge. The toner cartridge includes: a first housing having a discharge port through which toner is discharged; and a first shutter configured to move between a first closed position at which the discharge port is closed and a first open position at which the discharge port is opened. The drum cartridge is configured such that the toner cartridge is mounted thereon. The drum cartridge includes: a photosensitive drum; a development roller; a second housing having a reception port through which toner discharged from the discharge port is received; and a second shutter configured to move between a second closed position at which the reception port is closed and a second open position at which the reception port is opened. The drum cartridge is configured to be detachably mounted on the apparatus main body in a state where the toner cartridge is mounted on the drum cartridge. The first shutter and the second shutter are configured such that: when the drum cartridge is mounted onto the apparatus main body in a state where the toner cartridge is mounted on the drum cartridge, the first shutter moves from the first closed position to the first open position and the second shutter moves from the second closed position to the second open position, and when the drum cartridge is detached from the apparatus main body in a state where the toner cartridge is mounted on the drum cartridge, the first shutter moves from the first open position to the first closed position and the second shutter moves from the second open position to the second closed position.

BRIEF DESCRIPTION OF THE DRAWINGS

Embodiments in accordance with this disclosure will be described in detail with reference to the following figures wherein.

DETAILED DESCRIPTION

In the configuration described above, when a user detaches the toner cartridge from the drawer in a state where the drawer is located at the drawn position, the user needs to detach the toner cartridge from the drawer after performing an operation of closing the shutter of the toner cartridge.

Hence, in order to detach the toner cartridge from the drawer, it is necessary to perform the two operations, and thus the operability of the user is degraded.

In view of the foregoing, an example of an object of this disclosure is to provide an image forming apparatus in which a toner cartridge can be detached from a drum cartridge by a single operation in a configuration in which each of the toner cartridge and the drum cartridge has a shutter.

1. Outline of Image Forming Apparatus

Figure 1:
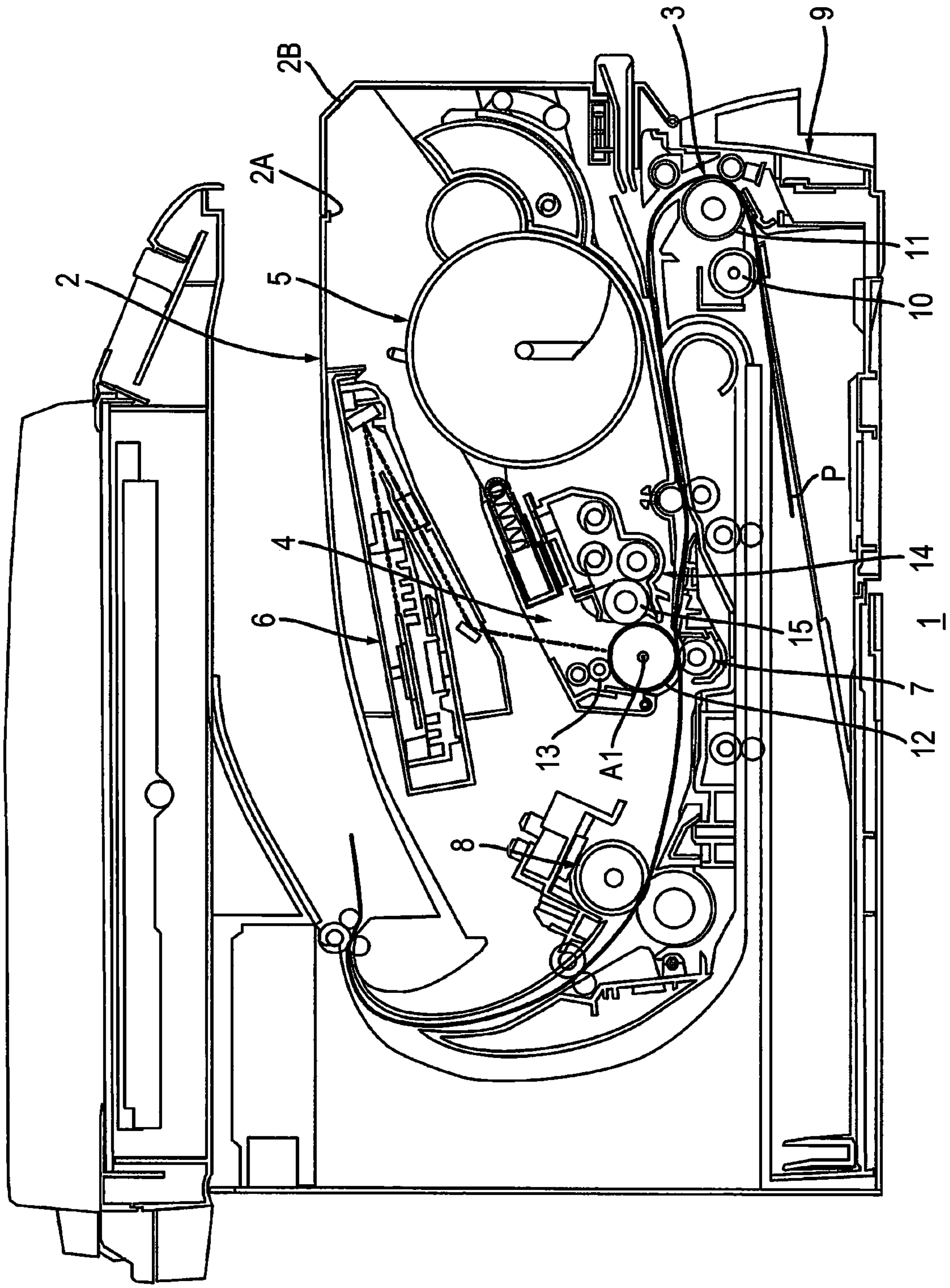
FIG. 1 is a schematic diagram showing an image forming apparatus.

An outline of an image forming apparatus 1 will be described with reference to FIG. 1.

The image forming apparatus 1 includes an apparatus main body 2, a paper feed device 3, a drum cartridge 4, a toner cartridge 5, an exposure device 6, a transfer roller 7, and a fixing device 8.

1.1. Apparatus Main Body

The drum cartridge 4 is mounted onto and detached from the apparatus main body 2 in a state where the toner cartridge 5 is mounted on the drum cartridge 4. The apparatus main body 2 has a box shape. The apparatus main body 2 accommodates the paper feed device 3, the exposure device 6, the transfer roller 7, and the fixing device 8. The apparatus main body 2 is also configured to accommodate the drum cartridge 4 and the toner cartridge 5. The apparatus main body 2 has an opening 2A and a cover 2B. When the drum cartridge 4 is mounted onto and detached from the apparatus main body 2 in a state where the toner cartridge 5 is mounted on the drum cartridge 4, the drum cartridge 4 passes through the opening 2A. The cover 2B is configured to move between an open position (not shown) at which the opening 2A is opened and a closed position (see FIG. 1) at which the opening 2A is closed.

1.2. Paper Feed Device

The paper feed device 3 includes a paper feed cassette 9, a pickup roller 10, and a paper feed roller 11. The paper feed cassette 9 accommodates print sheets P. The paper feed cassette 9 is detachably mounted on the apparatus main body 2. The pickup roller 10 picks up a print sheet P accommodated in the paper feed cassette 9. The paper feed roller 11 conveys, toward a photosensitive drum 12, the print sheet P picked up by the pickup roller 10.

1.3. Drum Cartridge

The toner cartridge 5 is configured to be mounted on the drum cartridge 4. The drum cartridge 4 includes the photosensitive drum 12, a charging roller 13, and a development unit 14.

The photosensitive drum 12 is configured to rotate about a first axis A1 which extends in an axial direction. The photosensitive drum 12 extends in the axial direction and has a cylindrical shape.

The charging roller 13 charges the circumferential surface of the photosensitive drum 12. The charging roller 13 contacts the circumferential surface of the photosensitive drum 12. The drum cartridge 4 may include a non-contact charger such as a scorotron-type charger instead of the charging roller 13.

The development unit 14 includes a development roller 15. In other words, the drum cartridge 4 includes the development roller 15. The development roller 15 supplies a toner within the development unit 14 to the photosensitive drum 12. The development roller 15 contacts the circumferential surface of the photosensitive drum 12.

1.4. Toner Cartridge

The toner cartridge 5 accommodates toner which is supplied to the development unit 14. The toner cartridge 5 is configured to be mounted onto and detached from the drum cartridge 4. The toner cartridge 5 supplies toner to the development unit 14 in a state where the toner cartridge 5 is mounted on the drum cartridge 4.

1.5. Exposure Device

The exposure device 6 is configured to expose the photosensitive drum 12.

Specifically, the exposure device 6 exposes the circumferential surface of the photosensitive drum 12 which is charged by the charging roller 13. In this way, an electrostatic latent image is formed on the circumferential surface of the photosensitive drum 12. The toner is supplied to the electrostatic latent image by the development roller 15, and thereby a toner image is formed on the circumferential surface of the photosensitive drum 12. Specifically, the exposure device 6 is a laser scan unit or an LED unit.

1.6. Transfer Roller

The transfer roller 7 contacts the photosensitive drum 12 in a state where the drum cartridge 4 is mounted on the apparatus main body 2. The print sheet P passes between the transfer roller 7 and the photosensitive drum 12. Here, the transfer roller 7 transfers the toner image formed on the circumferential surface of the photosensitive drum 12 to the print sheet P.

1.7. Fixing Device

The fixing device 8 is configured to apply heat and pressure to the print sheet P on which the toner image has been transferred and to thereby fix the toner image to the print sheet P. The print sheet P having passed through the fixing device 8 is discharged onto the upper surface of the apparatus main body 2.

2. Details of Toner Cartridge

The details of the toner cartridge 5 will be described with reference to FIGS. 2 and 5.

Figure 2:
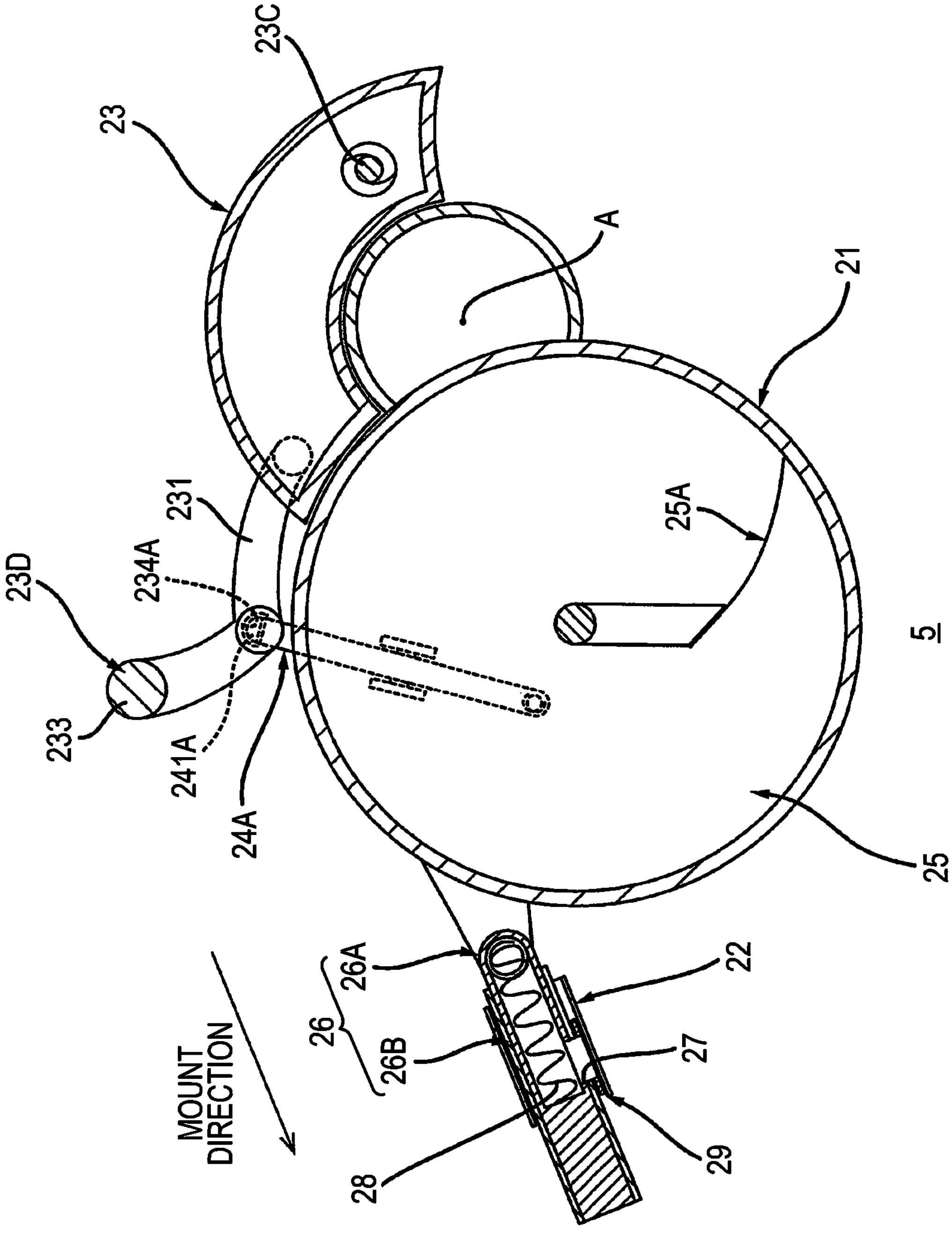
FIG. 2 is a cross-sectional view of a toner cartridge shown in FIG. 1, taken along a line A-A in FIG. 3.
Figure 3:
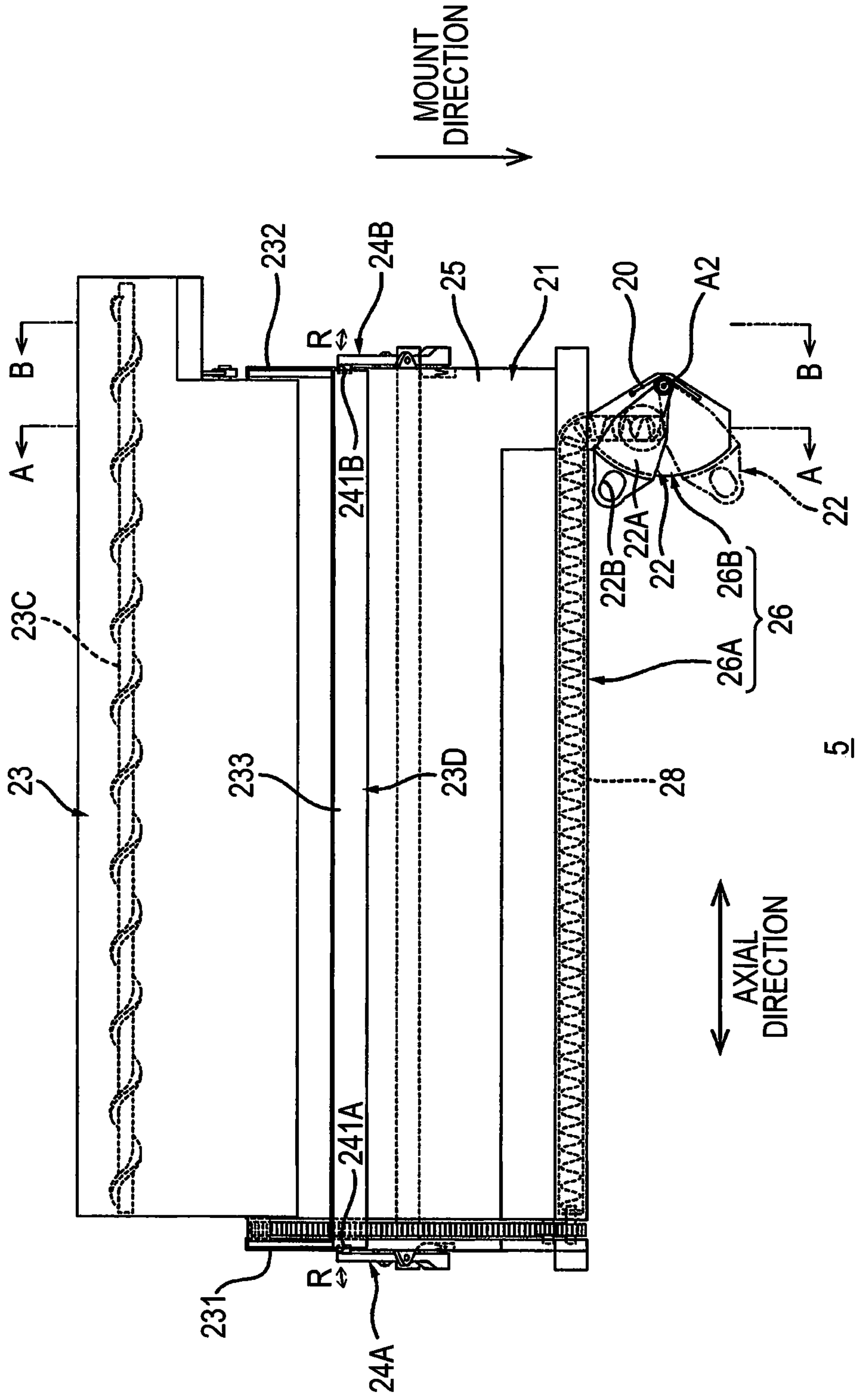
FIG. 3 is a plan view of the toner cartridge shown in FIG. 1.

As shown in FIGS. 2 and 3, the toner cartridge 5 includes a first housing 21, a first shutter 22, a torsion spring 20, a waste-toner container 23, and two lock members 24A and 24B.

2.1. First Housing

The first housing 21 includes a toner storage portion 25 and a toner conveyance pipe 26.

The toner storage portion 25 accommodates the toner supplied to the development unit 14. The toner storage portion 25 extends in the axial direction. The toner storage portion 25 has a cylindrical shape. The toner storage portion 25 includes an agitator 25A for agitating the toner. The agitator 25A is located within the toner storage portion 25.

Figure 8:
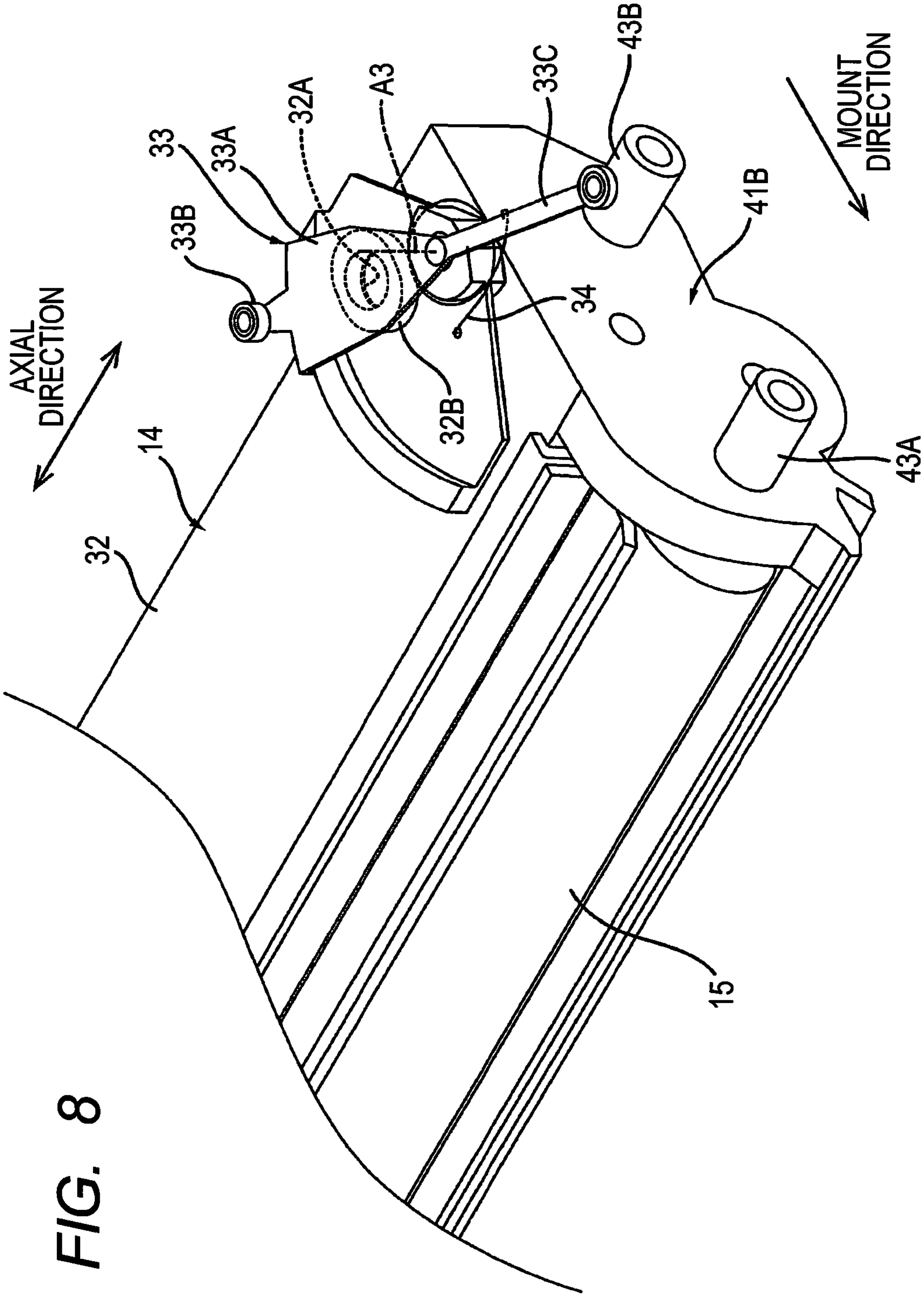
FIG. 8 is a perspective view of a second housing shown in FIG. 7.

The toner conveyance pipe 26 accommodates the toner supplied to the development unit 14 (see FIG. 8). As shown in FIG. 3, the toner conveyance pipe 26 includes a first portion 26A and a second portion 26B.

The first portion 26A is located on the circumferential surface of the toner storage portion 25. The first portion 26A extends in the axial direction. The first portion 26A has a cylindrical shape. The internal space of the first portion 26A communicates with the internal space of the toner storage portion 25. The second portion 26B extends from the first portion 26A.

The second portion 26B extends in a mount direction in which the drum cartridge 4 is mounted onto the apparatus main body 2. The mount direction intersects the axial direction. The mount direction is preferably perpendicular to the axial direction. The "perpendicular" is not limited to a case where the angle at which the mount direction intersects the axial direction is 90 degrees. The "perpendicular" includes a case where the angle at which the mount direction intersects the axial direction is larger than or equal to 80 degrees and smaller than or equal to 100 degrees. The second portion 26B is located at the opposite side of the toner storage portion 25 with respect to the first portion 26A in the mount direction. The internal space of the second portion 26B communicates with the internal space of the first portion 26A. As shown in FIG. 2, the second portion 26B includes a discharge port 27, a screw 28, and a seal 29. In other words, the first housing 21 includes the discharge port 27.

The discharge port 27 communicates with the internal space of the second portion 26B. With this configuration, the discharge port 27 discharges the toner within the second portion 26B.

The screw 28 is located within the first portion 26A (see FIG. 3) and the second portion 26B. The screw 28 conveys, to the discharge port 27, the toner supplied from the toner storage portion 25 into the first portion 26A. Specifically, the screw 28 is a shaftless screw.

The seal 29 is located on the outer surface of the second portion 26B. The seal 29 is located around the discharge port 27. The seal 29 surrounds the discharge port 27. The seal 29 contacts the first shutter 22 in a state where the first shutter 22 is located at a first closed position. In this way, in a state where the first shutter 22 is located at the first closed position, the seal 29 seals an area between the outer surface of the second portion 26B and the first shutter 22.

2.2. First Shutter

Figure 4:
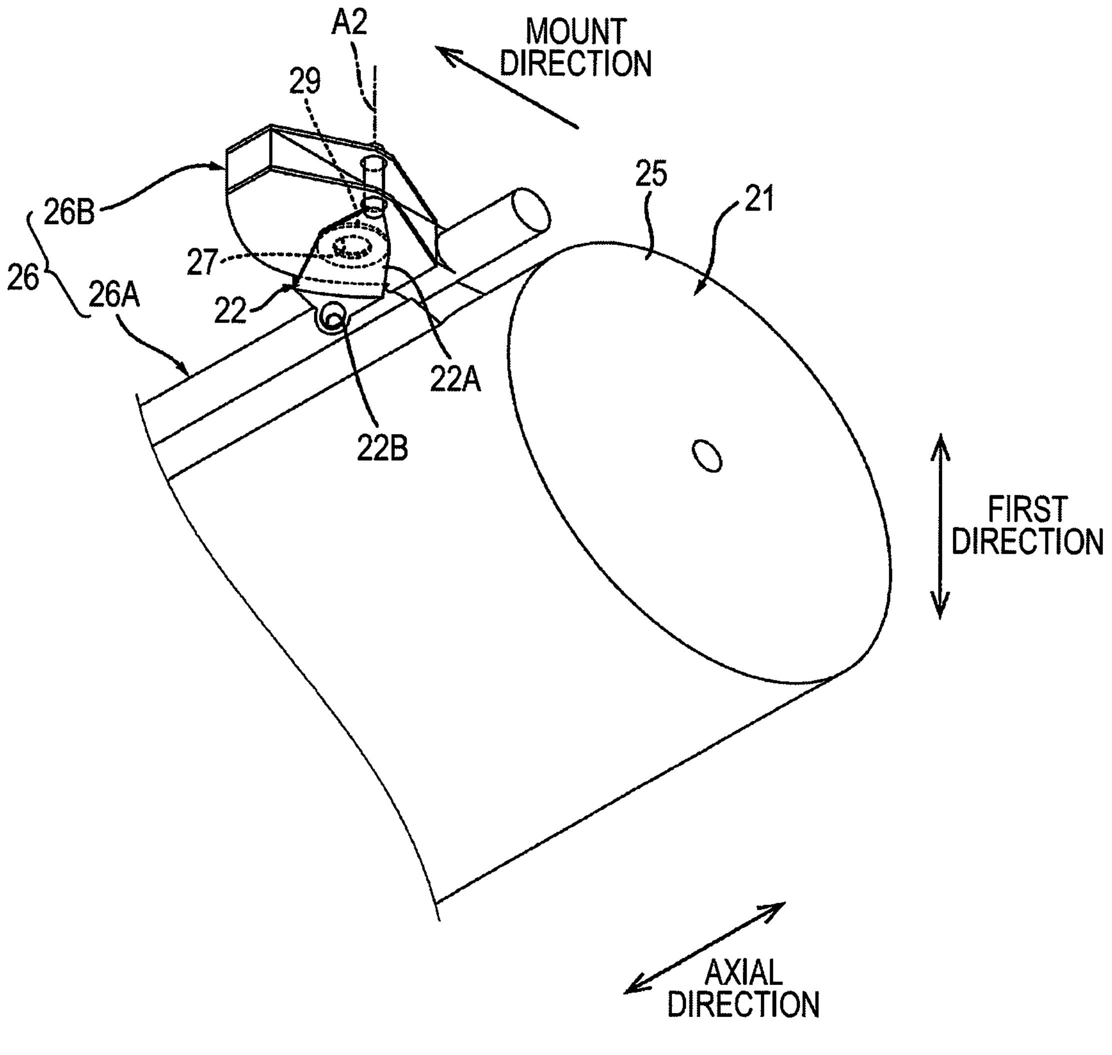
FIG. 4 is a perspective view of a first housing shown in FIG. 3.

As shown in FIGS. 3 and 4, the first shutter 22 is attached to the second portion 26B of the toner conveyance pipe 26. The first shutter 22 moves between the first closed position (indicated by solid lines in FIG. 3) at which the discharge port 27 is closed and a first open position (indicated by imaginary lines in FIG. 3) at which the discharge port 27 is opened. Specifically, the first shutter 22 is configured to rotatably move between the first closed position and the first open position about a second axis A2 extending in a first direction. The first direction intersects the axial direction and the mount direction. The first direction is preferably perpendicular to the axial direction and the mount direction. The direction of movement of the first shutter 22 is perpendicular to the first direction. In other words, the direction of movement of the first shutter 22 is parallel to the mount direction. The first shutter 22 includes a cover 22A and a hole 22B (an example of first engaging portion). In other words, the toner cartridge 5 includes the hole 22B. The hole 22B moves together with the cover 22A.

In a state where the first shutter 22 is located at the first closed position, the cover 22A covers the discharge port 27. In this way, in a state where the first shutter 22 is located at the first closed position, the first shutter 22 closes the discharge port 27. In a state where the first shutter 22 is located at the first open position, the cover 22A does not cover the discharge port 27. In this way, in a state where the first shutter 22 is located at the first open position, the first shutter 22 opens the discharge port 27. The cover 22A has a flat-plate shape.

The hole 22B is located at a position different from the cover 22A. Specifically, the hole 22B is a through hole. In a state where the toner cartridge 5 is mounted on the drum cartridge 4, the hole 22B engages a protrusion 33B (an example of second engaging portion) of a second shutter 33 (see FIG. 7). The second shutter 33 will be described later. Specifically, in a state where the toner cartridge 5 is mounted on the drum cartridge 4, the protrusion 33B of the second shutter 33 (see FIG. 8) fits into the hole 22B. In this way, the first shutter 22 rotatably moves together with the second shutter 33. The first shutter 22 may include a protrusion instead of the hole 22B. In this case, the second shutter 33 includes, instead of the protrusion 33B, a hole into which the protrusion of the first shutter 22 fits.

2.3. Torsion Spring

The torsion spring 20 shown in FIG. 3 presses the first shutter 22 located at the first open position toward the first closed position. One end of the torsion spring 20 is attached to the second portion 26B, and the other end of the torsion spring 20 is attached to the first shutter 22.

2.4. Waste-Toner Container

Figure 5:
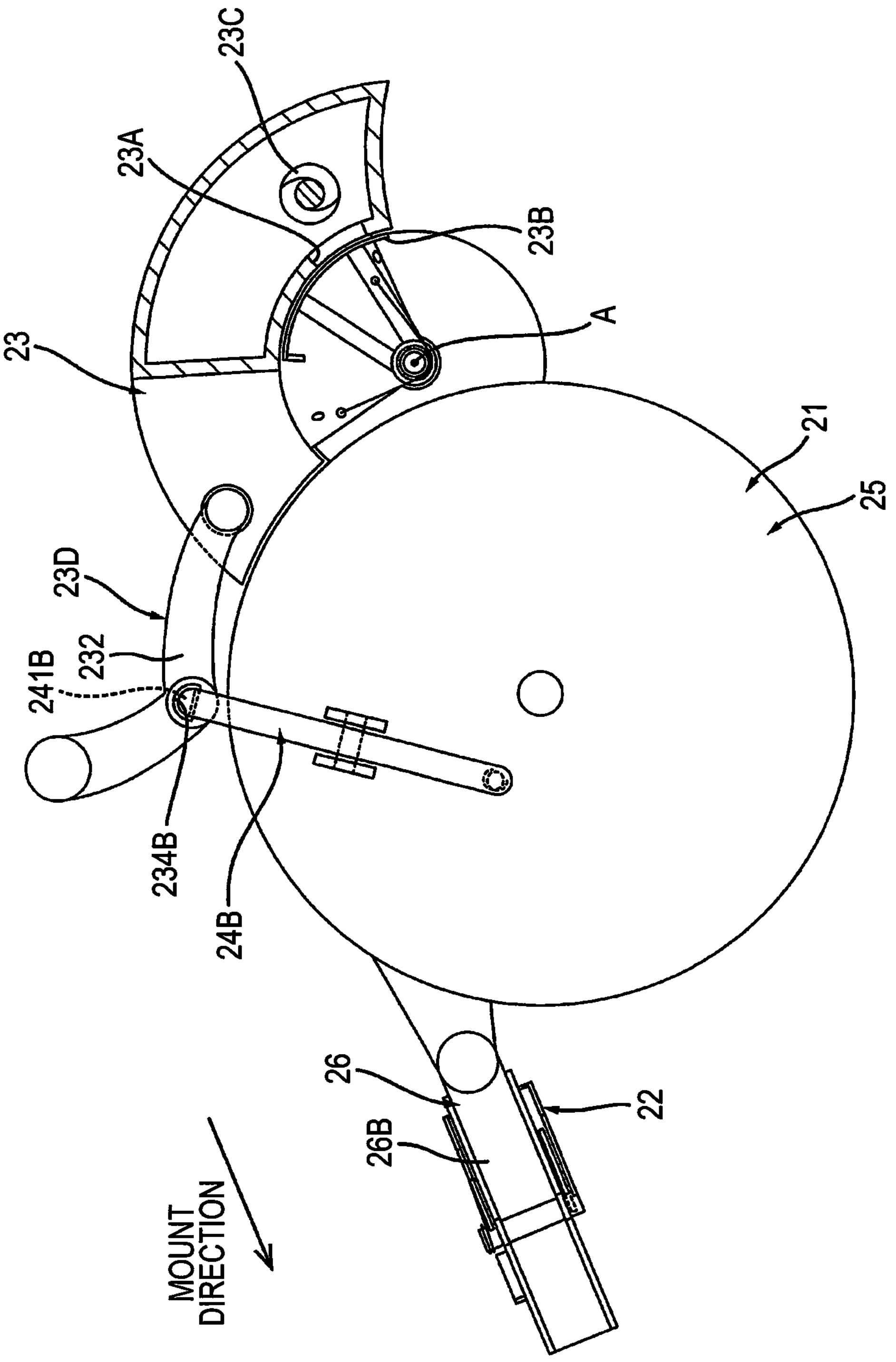
FIG. 5 is a cross-sectional view of the toner cartridge, taken along a line B-B shown in FIG. 3.

As shown in FIGS. 2 and 5, the waste-toner container 23 is located at the opposite side of the toner conveyance pipe 26 with respect to the toner storage portion 25 in the mount direction. The waste-toner container 23 accommodates the waste toner which is removed by a drum cleaner 36C (see FIG. 6) from the circumferential surface of the photosensitive drum 12. The drum cleaner 36C will be described later. The waste-toner container 23 moves between a first position (see FIG. 5) and a second position (see FIG. 12) relative to the first housing 21. Specifically, the waste-toner container 23 rotatably moves about an axis A between the first position and the second position. As shown in FIG. 5, the waste-toner container 23 includes a waste-toner reception port 23A, a shutter 23B, a screw 23C, and a handle 23D.

Figure 12:
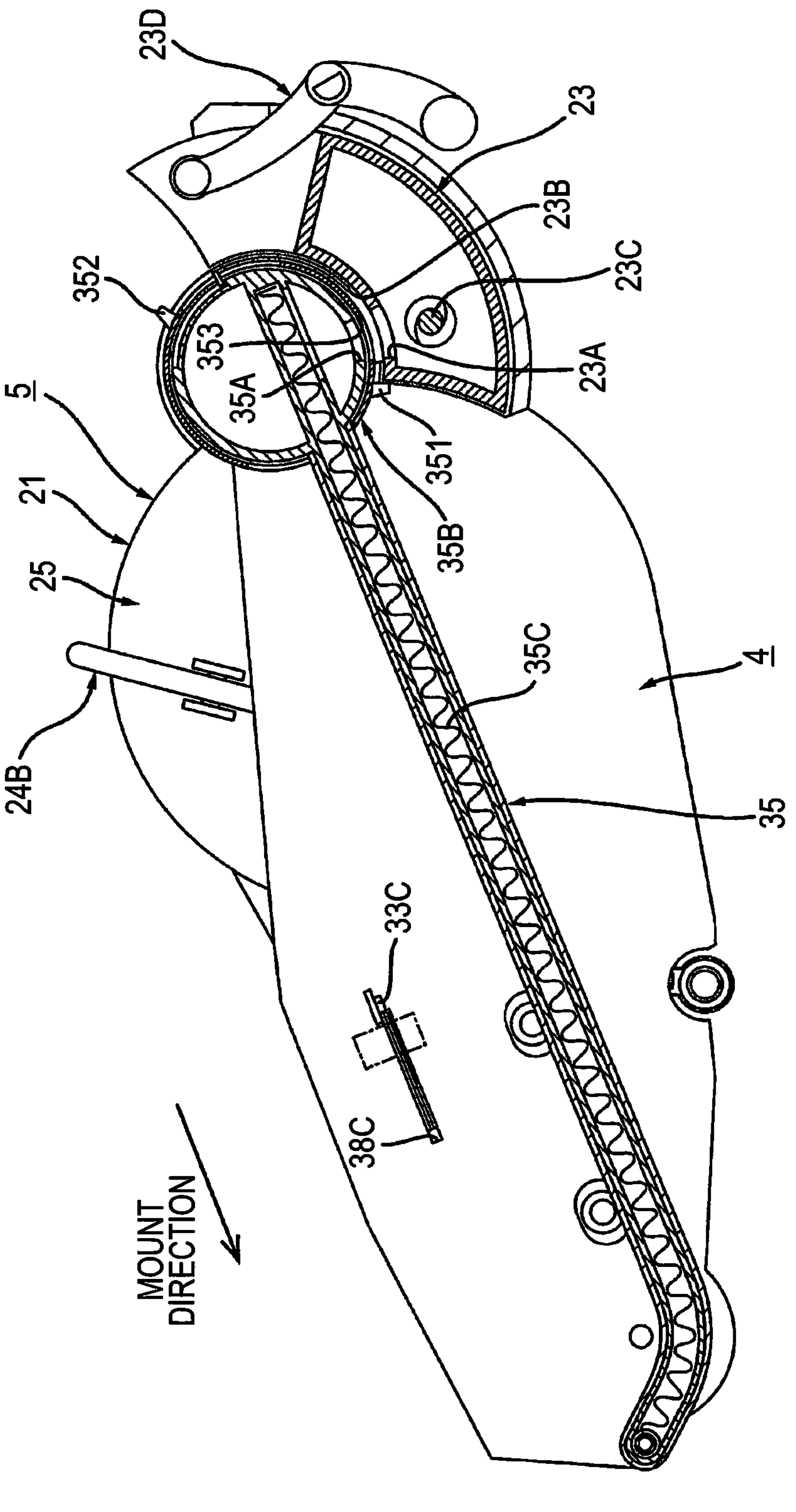
FIG. 12 is a cross-sectional view of the drum cartridge on which the toner cartridge is mounted, corresponding to the line B-B shown in FIG. 3.

The waste-toner reception port 23A is located on the outer surface of the waste-toner container 23. The waste-toner reception port 23A communicates with the internal space of the waste-toner container 23. As shown in FIG. 12, when the waste-toner container 23 is located at the second position in a state where the toner cartridge 5 is mounted on the drum cartridge 4, the waste-toner reception port 23A communicates with a waste-toner discharge port 35A of a waste-toner conveyance pipe 35. In this way, when the waste-toner container 23 is located at the second position in a state where the toner cartridge 5 is mounted on the drum cartridge 4, the waste-toner container 23 receives the waste toner from the waste-toner conveyance pipe 35. The waste-toner conveyance pipe 35 will be described later. When the waste-toner container 23 is located at the first position in a state where the toner cartridge 5 is mounted on the drum cartridge 4, the waste-toner reception port 23A does not communicate with the waste-toner discharge port 35A of the waste-toner conveyance pipe 35. In other words, when the waste-toner container 23 is located at the first position in a state where the toner cartridge 5 is mounted on the drum cartridge 4, the waste-toner container 23 does not receive the waste toner.

As shown in FIGS. 5 and 12, the shutter 23B moves, relative to the waste-toner container 23, between a closed position (see FIG. 5) at which the waste-toner reception port 23A is closed and an open position (see FIG. 12) at which the waste-toner reception port 23A is opened. As shown in FIG. 5, when the waste-toner container 23 is located at the first position, the shutter 23B is located at the closed position. As shown in FIG. 12, when the waste-toner container 23 is located at the second position, the shutter 23B is located at the open position.

As shown in FIG. 3, the screw 23C is located within the waste-toner container 23. The screw 23C extends in the axial direction. The screw 23C conveys the waste toner within the waste-toner container 23 in the axial direction. Specifically, the screw 23C is an auger screw.

As shown in FIGS. 3 and 5, the handle 23D extends from the waste-toner container 23. The handle 23D includes a first arm 231, a second arm 232, and a bar 233.

The first arm 231 extends from one end portion of the waste-toner container 23 in the axial direction. The first arm 231 has a concave portion 234A (see FIG. 2). In a state where the waste-toner container 23 is located at the first position, a claw 241A (see FIGS. 2, 3) of the lock member 24A fits into the concave portion 234A.

The second arm 232 extends from the other end portion of the waste-toner container 23 in the axial direction. The second arm 232 is located away from the first arm 231 in the axial direction. The second arm 232 includes a concave portion 234B. In a state where the waste-toner container 23 is located at the first position, a claw 241B (see FIGS. 3, 5) of the lock member 24B fits into the concave portion 234B. The claw 241A of the lock member 24A fits into the concave portion 234A, the claw 241B of the lock member 24B fits into the concave portion 234B, and thereby the waste-toner container 23 is kept in the first position.

The bar 233 is located between the first arm 231 and the second arm 232. The bar 233 extends in the axial direction and has a cylindrical shape. One end of the bar 233 in the axial direction is connected to the first arm 231. The other end of the bar 233 in the axial direction is connected to the second arm 232.

2.5. Two Lock Members

As shown in FIG. 3, the lock member 24A is located on one side surface of the first housing 21 in the axial direction. The lock member 24A is configured to rotatably move between a lock position (see FIG. 3) and a lock release position (not shown) relative to the first housing 21 (direction R in FIG. 3). The lock member 24A includes the claw 241A. When the lock member 24A rotatably moves from the lock release position to the lock position, the claw 241A moves in a direction approaching the first housing 21 in the axial direction. When the lock member 24A is located at the lock position, the claw 241A fits into the concave portion 234A (see FIG. 2) of the first arm 231. When the lock member 24A rotatably moves from the lock position to the lock release position, the claw 241A moves in a direction away from the first housing 21 in the axial direction. When the lock member 24A is located at the lock release position, the claw 241A separates from the concave portion 234A of the first arm 231.

The lock member 24B is located on the other side surface of the first housing 21 in the axial direction. The lock member 24B includes the claw 241B. The lock member 24B has the same configuration as the lock member 24A, and is described as with the lock member 24A. Hence, the description of the lock member 24B will be omitted.

3. Details of Drum Cartridge

The details of the drum cartridge 4 will be described with reference to FIGS. 6 to 8.

Figure 6:
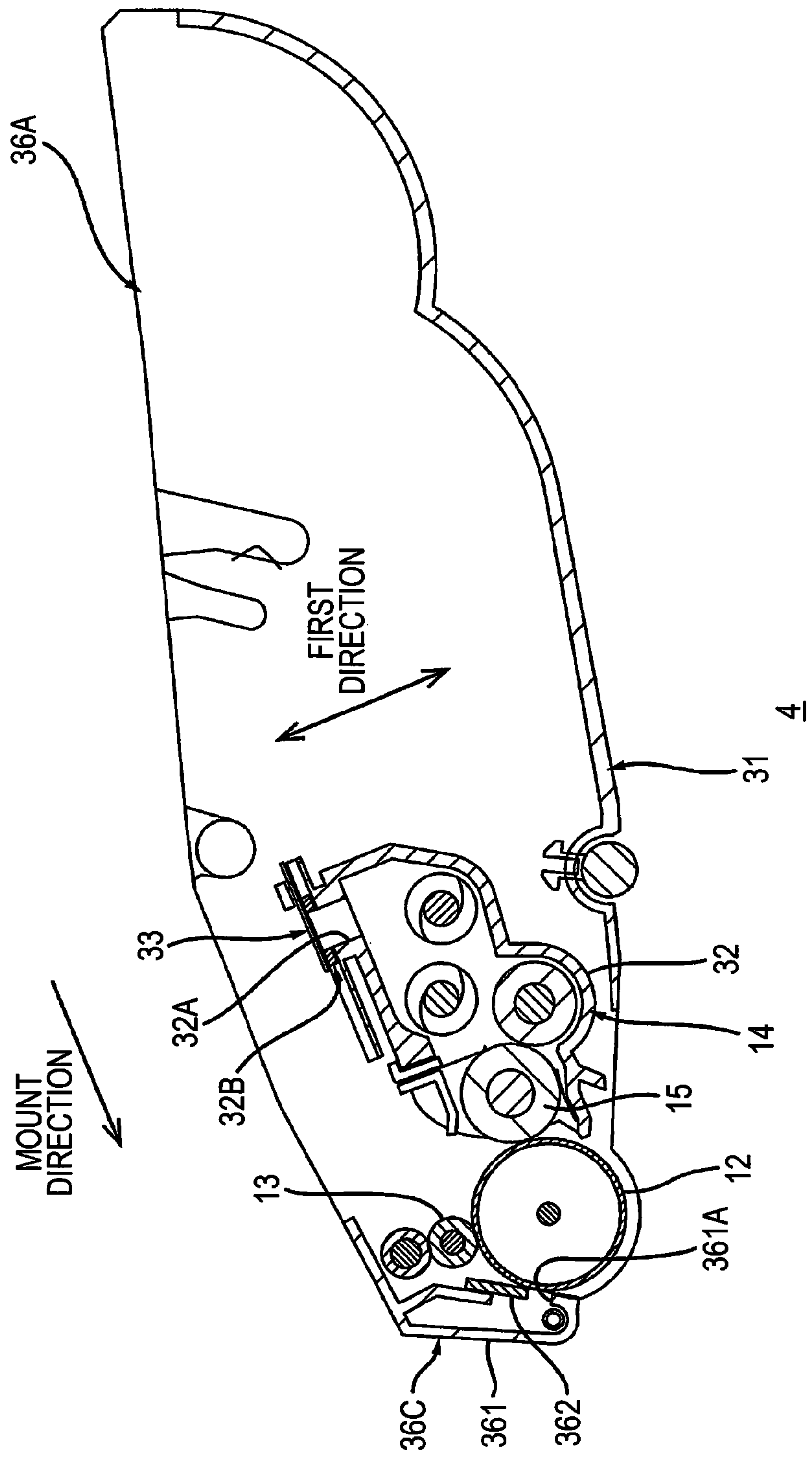
FIG. 6 is a cross-sectional view of a drum cartridge shown in FIG. 1, taken along a line C-C shown in FIG. 7.
Figure 7:
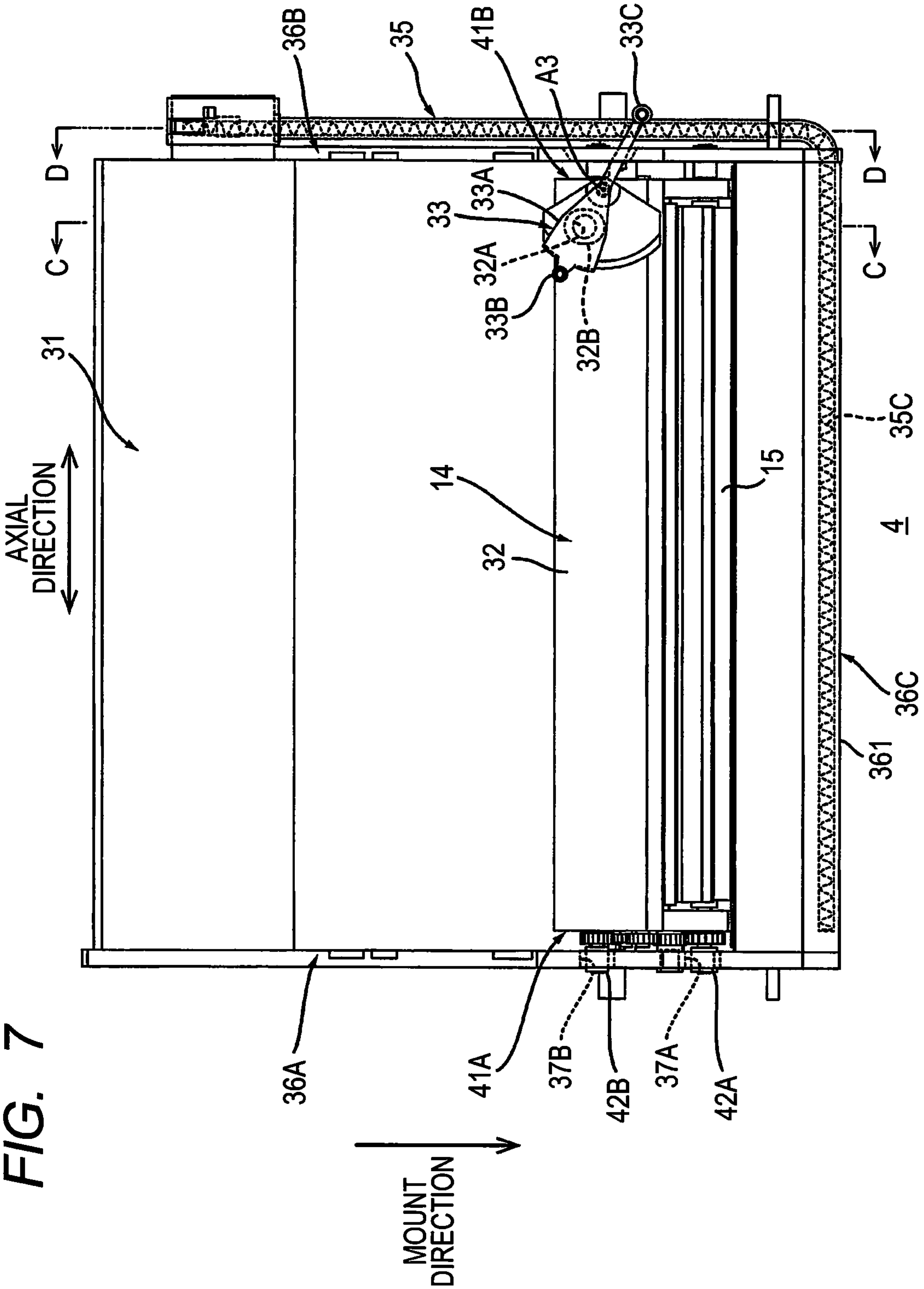
FIG. 7 is a plan view of the drum cartridge shown in FIG. 1.

As shown in FIGS. 6 and 7, the drum cartridge 4 includes a frame 31, a second housing 32, the second shutter 33, a spring 34 (see FIG. 8), and the waste-toner conveyance pipe 35 (see FIG. 7).

3.1. Frame

The frame 31 is configured such that the toner cartridge 5 can be mounted thereon. Specifically, the frame 31 includes a drum side plate 36A, a drum side plate 36B, and the drum cleaner 36C.

The drum side plate 36A is located at one end portion of the frame 31 in the axial direction. The drum side plate 36A extends in the mount direction. The drum side plate 36A supports one end of the photosensitive drum 12 in the axial direction. The drum side plate 36A has a through hole 37A and a through hole 37B. The through hole 37A is an elongated hole which extends in the mount direction. The through hole 37B is an elongated hole which extends in the mount direction. The through hole 37B is located away from the through hole 37A in the mount direction.

Figure 10:
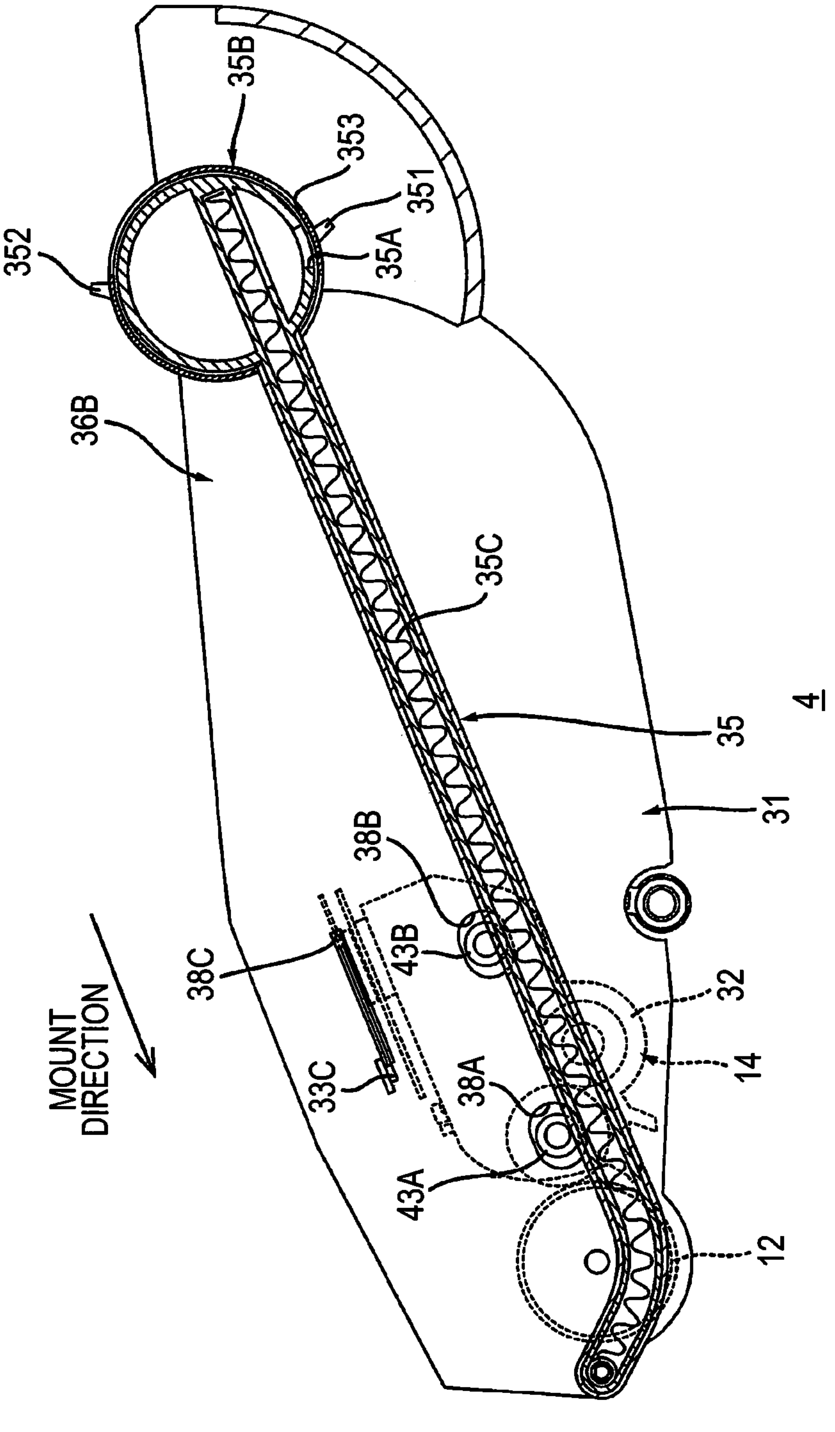
FIG. 10 is a cross-sectional view of the toner cartridge shown in FIG. 7, taken along a line D-D.

The drum side plate 36B is located at the other end portion of the frame 31 in the axial direction. The drum side plate 36B is located away from the drum side plate 36A in the axial direction. The drum side plate 36B extends in the mount direction. The drum side plate 36B supports the other end of the photosensitive drum 12 in the axial direction. As shown in FIG. 10, the drum side plate 36B has a through hole 38A, a through hole 38B and a slit 38C. Each of the through hole 38A and the through hole 38B is an elongated hole which extends in the mount direction. The through hole 38B is located away from the through hole 38A in the mount direction. The slit 38C extends in the mount direction.

As shown in FIG. 6, the drum cleaner 36C cleans the circumferential surface of the photosensitive drum 12 after the toner image is transferred to the print sheet P. The drum cleaner 36C includes a cleaner frame 361 and a cleaning blade 362.

As shown in FIG. 7, the cleaner frame 361 is located between the drum side plate 36A and the drum side plate 36B in the axial direction. The cleaner frame 361 extends in the axial direction. The cleaner frame 361 has a rectangular tube shape. One end of the cleaner frame 361 in the axial direction is connected to the drum side plate 36A. The other end of the cleaner frame 361 in the axial direction is connected to the drum side plate 36B. As shown in FIG. 6, the cleaner frame 361 includes an opening 361A. The opening 361A communicates with the internal space of the cleaner frame 361.

The cleaning blade 362 is attached to the cleaner frame 361. The cleaning blade 362 extends in the axial direction and has a plate shape. An edge of the cleaning blade 362 is located within the opening 361A. The edge of the cleaning blade 362 contacts the circumferential surface of the photosensitive drum 12. With this configuration, when the photosensitive drum 12 rotates, the toner adhered to the circumferential surface of the photosensitive drum 12 is scraped off with the edge of the cleaning blade 362 and is accommodated into the cleaner frame 361 through the opening 361A.

3.2. Second Housing

As shown in FIGS. 6 and 7, the second housing 32 is the frame of the development unit 14. The second housing 32 is located between the drum side plate 36A and the drum side plate 36B in the axial direction. The second housing 32 includes a first side plate 41A and a second side plate 41B.

The first side plate 41A is located at one end portion of the second housing 32 in the axial direction. The first side plate 41A extends in the mount direction. The first side plate 41A includes a boss 42A and a boss 42B. Each of the boss 42A and the boss 42B extends from the first side plate 41A in the axial direction. The boss 42A fits in the through hole 37A of the drum side plate 36A. The boss 42B fits in the through hole 37B of the drum side plate 36A.

The second side plate 41B is located spaced away from the first side plate 41A in the axial direction. The second side plate 41B is located at the other end portion of the second housing 32 in the axial direction. The second side plate 41B extends in the mount direction. As shown in FIG. 8, the second side plate 41B includes a boss 43A and a boss 43B.

Each of the boss 43A and the boss 43B extends from the second side plate 41B in the axial direction. As shown in FIG. 10, the boss 43A fits in the through hole 38A of the drum side plate 36B. The boss 43B fits in the through hole 38B of the drum side plate 36B. The boss 42A (see FIG. 7) fits in the through hole 37A (see FIG. 7), the boss 42B (see FIG. 7) fits in the through hole 37B (see FIG. 7), the boss 43A fits in the through hole 38A, the boss 43B fits in the through hole 38B, and thereby the frame 31 supports the second housing 32 such that the second housing 32 moves relative to the photosensitive drum 12. Specifically, the frame 31 supports the second housing 32 such that the second housing 32 moves in the mount direction. In other words, the direction of movement of the second housing 32 relative to the photosensitive drum 12 is the same as the mount direction, and is parallel to the direction of movement of the second shutter 33 (see FIG. 6).

As shown in FIGS. 6 and 7, the second housing 32 includes a reception port 32A and a seal 32B.

The reception port 32A is located on the outer surface of the second housing 32 facing in the first direction. The reception port 32A communicates with the internal space of the second housing 32. In a state where the toner cartridge 5 is mounted on the drum cartridge 4, the reception port 32A faces the discharge port 27 (see FIG. 11) in the first direction. Specifically, in a state where the toner cartridge 5 is mounted on the drum cartridge 4 and the drum cartridge 4 is mounted on the apparatus main body 2, the first shutter 22 is located at the first open position, the second shutter 33 is located at a second open position, and thereby the reception port 32A communicates with the discharge port 27. With this configuration, the reception port 32A receives the toner discharged from the discharge port 27. In a state where the toner cartridge 5 is mounted on the drum cartridge 4 and the drum cartridge 4 is detached from the apparatus main body 2, the first shutter 22 is located at the first closed position, the second shutter 33 is located at a second closed position, and thereby the reception port 32A does not communicate with the discharge port 27.

As shown in FIGS. 6 and 7, the seal 32B is located on the outer surface of the second housing 32 in the first direction. The seal 32B is located around the reception port 32A. The seal 32B surrounds the reception port 32A. In a state where the second shutter 33 is located at the second closed position, the seal 32B contacts the second shutter 33. With this configuration, in a state where the second shutter 33 is located at the second closed position, the seal 32B seals an area between the outer surface of the second housing 32 and the second shutter 33. When the image forming apparatus 1 forms an image, the development unit 14 moves relative to the photosensitive drum 12 due to vibrations caused by the rotation of the development roller 15 and the photosensitive drum 12 in a state where the development roller 15 and the photosensitive drum 12 are in contact with each other. The length of the seal 32B in the mount direction is set such that even when the development unit 14 moves relative to the photosensitive drum 12, the contact with the second shutter 33 is maintained.

3.3. Second Shutter

As shown in FIGS. 7 and 8, the second shutter 33 is attached to the second housing 32. The second shutter 33 moves between the second closed position (see FIG. 8) at which the reception port 32A is closed and the second open position (see FIG. 9) at which the reception port 32A is opened. Specifically, the second shutter 33 rotatably moves between the second closed position and the second open position about a third axis A3 extending in the first direction. In other words, the direction of movement of the second shutter 33 is perpendicular to the first direction. In other words, the direction of movement of the second shutter 33 is parallel to the mount direction. The second shutter 33 includes a cover 33A, a protrusion 33B, and a lever 33C. In other words, the drum cartridge 4 includes the lever 33C. The lever 33C moves together with the cover 33A and the protrusion 33B. The cover 33A and the protrusion 33B are located at an opposite side from the lever 33C with respect to the third axis A3.

Figure 9:
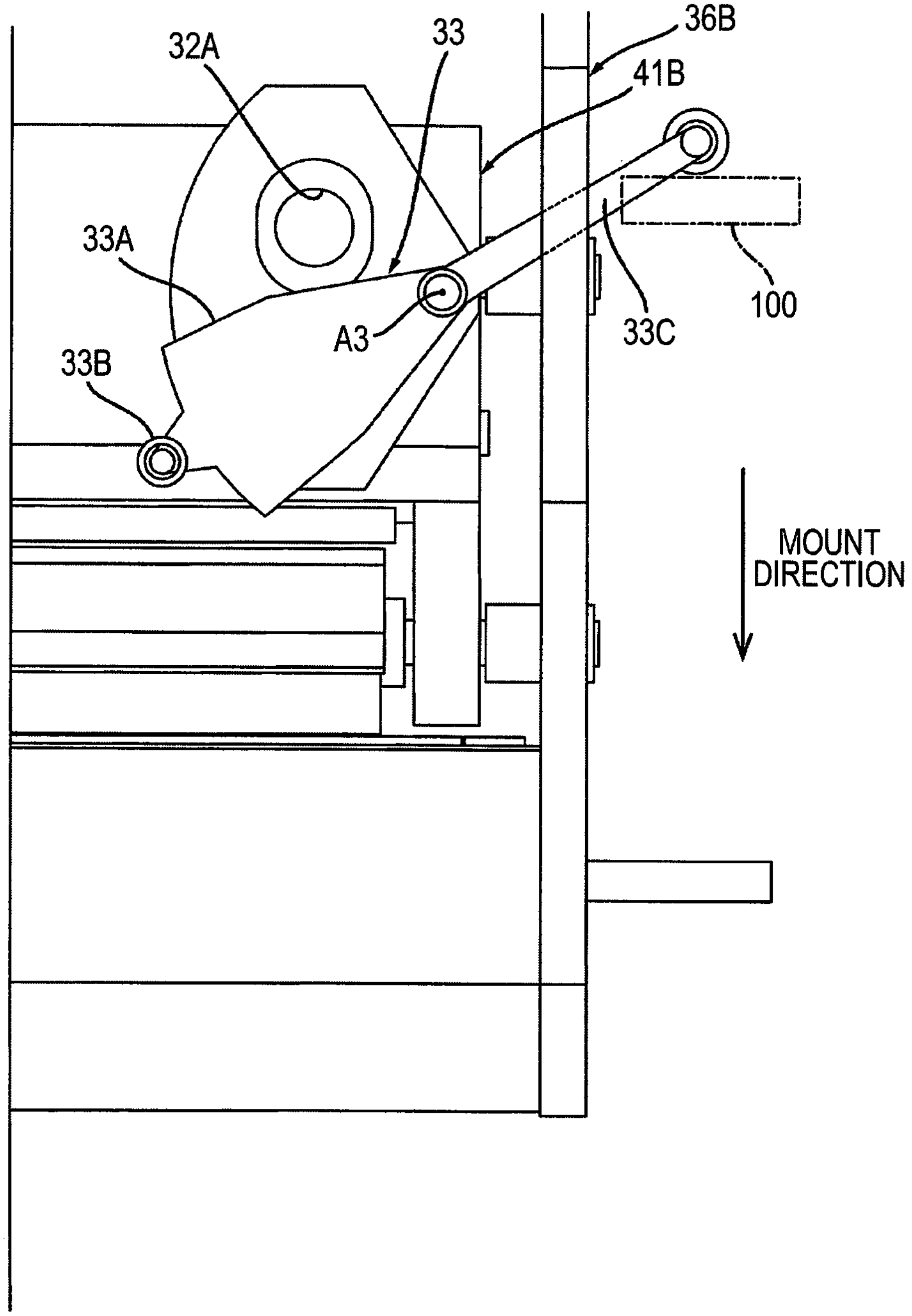
FIG. 9 is an enlarged view of the second housing shown in FIG. 7 and shows a state where a second shutter is located at a second open position.

As shown in FIG. 7, the cover 33A is located between the first side plate 41A and the second side plate 41B in the axial direction. In other words, the second shutter 33 is located between the first side plate 41A and the second side plate 41B in the axial direction. The cover 33A is located between the drum side plate 36A and the drum side plate 36B in the axial direction. As shown in FIG. 8, in a state where the second shutter 33 is located at the second closed position, the cover 33A covers the reception port 32A. With this configuration, in a state where the second shutter 33 is located at the second closed position, the second shutter 33 closes the reception port 32A. As shown in FIG. 9, in a state where the second shutter 33 is located at the second open position, the cover 33A does not cover the reception port 32A. With this configuration, in a state where the second shutter 33 is located at the second open position, the second shutter 33 opens the reception port 32A. The cover 33A has a flat-plate shape.

As shown in FIG. 8, the protrusion 33B is located at a position different from the cover 33A. In a state where the toner cartridge 5 is mounted on the drum cartridge 4, the protrusion 33B fits into the hole 22B (see FIG. 4) of the first shutter 22. With this configuration, the second shutter 33 rotatably moves together with the first shutter 22.

The lever 33C extends from the cover 33A. The third axis A3 is located between the lever 33C and the cover 33A in the axial direction. The cover 33A is located between the protrusion 33B and the lever 33C in the axial direction. At least part of the lever 33C is located at the opposite side from the first side plate 41A (see FIG. 7) with respect to the second side plate 41B in the axial direction. At least part of the lever 33C is located at the opposite side from the drum side plate 36A (see FIG. 7) with respect to the drum side plate 36B in the axial direction. The part of the lever 33 is exposed from the slit 38C of the drum side plate 36B. When the drum cartridge 4 is mounted onto the apparatus main body 2 in a state where the toner cartridge 5 is mounted on the drum cartridge 4, the lever 33C contacts a part 100 of the apparatus main body 2, and the second shutter 33 is moved from the second closed position to the second open position.

The phrase "when the drum cartridge 4 is mounted onto the apparatus main body 2 in a state where the toner cartridge 5 is mounted on the drum cartridge 4" means any timing in a series of operations in which the drum cartridge 4 is mounted by the user onto the apparatus main body 2 in a state where the toner cartridge 5 is mounted on the drum cartridge 4. In other words, the timing at which the lever 33C moves the second shutter 33 from the second closed position to the second open position is not limited to the moment when the drum cartridge 4 is just mounted on the apparatus main body 2 in a state where the toner cartridge 5 is mounted on the drum cartridge 4. The phrase "when the drum cartridge 4 is mounted onto the apparatus main body 2 in a state where the toner cartridge 5 is mounted on the drum cartridge 4" does not include "a state where the toner cartridge 5 is mounted on the drum cartridge 4 and the drum cartridge 4 is mounted on the apparatus main body 2".

The part 100 of the apparatus main body 2 is located within the apparatus main body 2. Specifically, the part 100 of the apparatus main body 2 is a protrusion which is located within the apparatus main body 2.

As shown in FIG. 9, in a state where the drum cartridge 4 is mounted on the apparatus main body 2, the lever 33C is kept in contact with the part 100 of the apparatus main body 2. With this configuration, the lever 33C keeps the second shutter 33 at the second open position.

3.4. Spring

Specifically, the spring 34 shown in FIG. 8 is a tension spring. One end of the spring 34 is attached to the second housing 32. The other end of the spring 34 is attached to the lever 33C. The spring 34 pulls the second shutter 33 located at the second open position (see FIG. 9) toward the second closed position (see FIG. 8). With this configuration, in a state where the drum cartridge 4 is detached from the apparatus main body 2, the spring 34 locates the second shutter 33 at the second closed position.

3.5. Waste-Toner Conveyance Pipe

As shown in FIG. 12, in a state where the toner cartridge 5 is mounted on the drum cartridge 4, the waste-toner conveyance pipe 35 connects the drum cleaner 36C (see FIG. 11) with the waste-toner container 23. The waste-toner conveyance pipe 35 includes the waste-toner discharge port 35A, a shutter 35B, and a screw 35C.

The waste-toner discharge port 35A communicates with the internal space of the waste-toner conveyance pipe 35. When the waste-toner container 23 is located at the second position in a state where the toner cartridge 5 is mounted on the drum cartridge 4, the shutter 35B is located at an open position, and thereby the waste-toner discharge port 35A communicates with the waste-toner reception port 23A of the waste-toner container 23. With this configuration, when the waste-toner container 23 is located at the second position in a state where the toner cartridge 5 is mounted on the drum cartridge 4, the waste-toner conveyance pipe 35 supplies the waste toner to the waste-toner container 23. The open position of the shutter 35B will be described later. When the waste-toner container 23 is located at the first position (see FIG. 5) in a state where the toner cartridge 5 is mounted on the drum cartridge 4, the shutter 35B is located at a closed position, and thereby waste-toner discharge port 35A does not communicate with the waste-toner reception port 23A of the waste-toner container 23. In other words, when the waste-toner container 23 is located at the first position in a state where the toner cartridge 5 is mounted on the drum cartridge 4, the waste-toner conveyance pipe 35 does not supply the waste toner to the waste-toner container 23.

As shown in FIGS. 10 and 12, the shutter 35B moves between the closed position (see FIG. 10) and the open position (see FIG. 12) relative to the waste-toner conveyance pipe 35. In a state where the toner cartridge 5 is mounted on the drum cartridge 4, the shutter 35B rotatably moves together with the waste-toner container 23. Specifically, the shutter 35B includes a protrusion 351, a protrusion 352, and an opening 353.

When the waste-toner container 23 rotatably moves from the first position (see FIG. 5) to the second position (see FIG. 12) in a state where the toner cartridge 5 is mounted on the drum cartridge 4, the protrusion 351 contacts the waste-toner container 23. With this configuration, as the waste-toner container 23 rotatably moves from the first position to the second position in a state where the toner cartridge 5 is mounted on the drum cartridge 4, the shutter 35B moves from the closed position to the open position.

When the waste-toner container 23 rotatably moves from the second position (see FIG. 12) to the first position (see FIG. 5) in a state where the toner cartridge 5 is mounted on the drum cartridge 4, the protrusion 352 contacts the waste-toner container 23. With this configuration, as the waste-toner container 23 rotatably moves from the second position to the first position in a state where the toner cartridge 5 is mounted on the drum cartridge 4, the shutter 35B moves from the open position to the closed position.

As shown in FIG. 12, in a state where the shutter 35B is located at the open position, the opening 353 communicates with the waste-toner discharge port 35A. With this configuration, in a state where the shutter 35B is located at the open position, the shutter 35B opens the waste-toner discharge port 35A. As shown in FIG. 10, in a state where the shutter 35B is located at the closed position, the opening 353 is shifted from the waste-toner discharge port 35A so as not to communicate with the waste-toner discharge port 35A. In this case, the shutter 35B covers the waste-toner discharge port 35A. With this configuration, in a state where the shutter 35B is located at the closed position, the shutter 35B closes the waste-toner discharge port 35A.

As shown in FIGS. 7 and 10, the screw 35C is located within the drum cleaner 36C and the waste-toner conveyance pipe 35. The screw 35C conveys the waste toner within the drum cleaner 36C to the waste-toner discharge port 35A. The screw 35C is a shaftless screw.

4. State where Toner Cartridge is Mounted on Drum Cartridge

The state where the toner cartridge 5 is mounted on the drum cartridge 4 will be described with reference to FIGS. 11 and 12.

Figure 11:
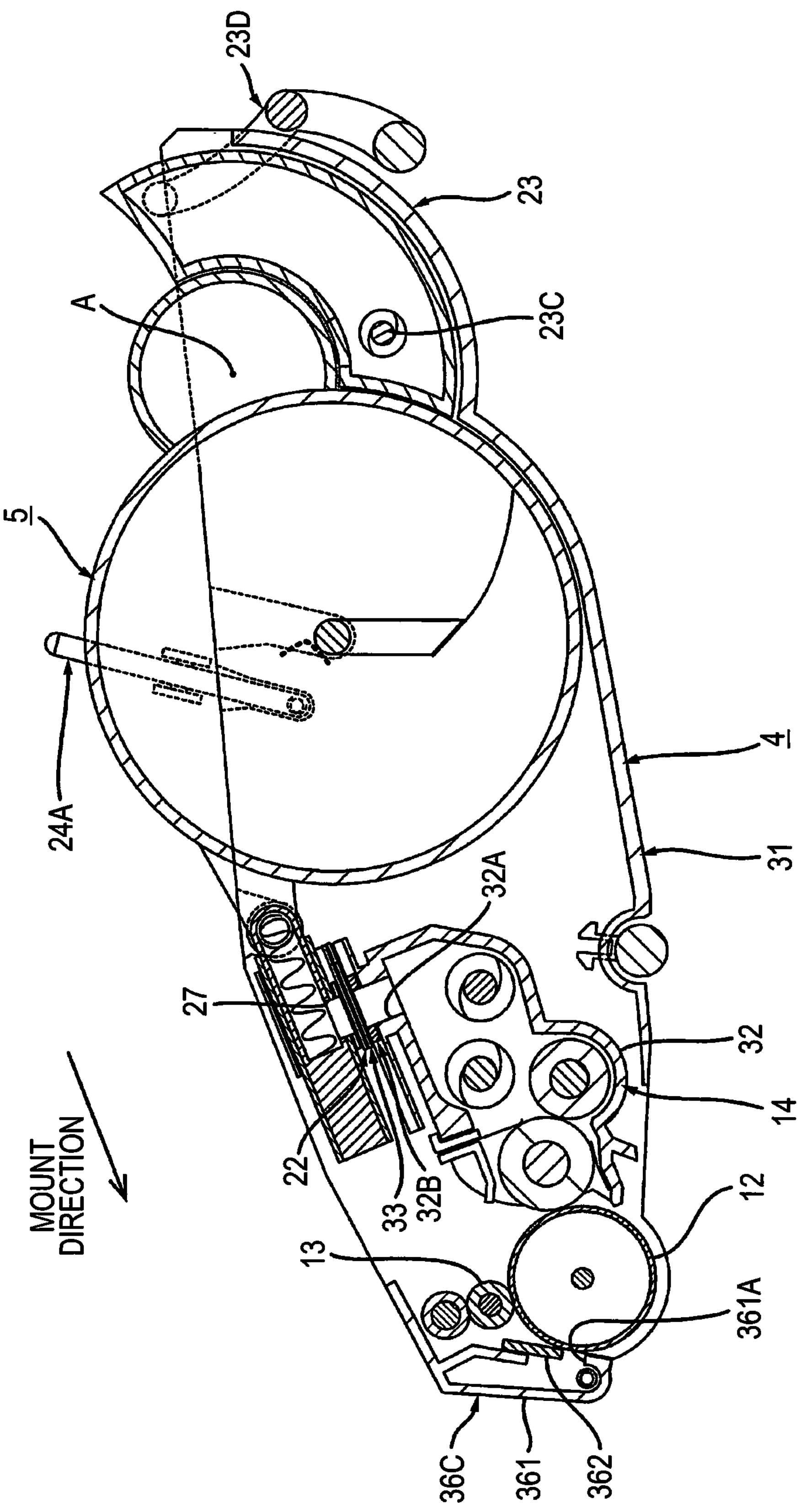
FIG. 11 is a cross-sectional view of the drum cartridge on which the toner cartridge is mounted, corresponding to the line A-A shown in FIG. 3, and shows a state where such drum cartridge is detached from an apparatus main body.

As shown in FIG. 11, in a state where the toner cartridge 5 is mounted on the drum cartridge 4, the first shutter 22 is located at the first closed position, and the second shutter 33 is located at the second closed position. Hence, the toner cartridge 5 does not supply the toner to the development unit 14.

As shown in FIG. 12, when the waste-toner container 23 is located at the second position in a state where the toner cartridge 5 is mounted on the drum cartridge 4, the shutter 23B is located at the open position, and the shutter 35B is located at the open position. With this configuration, the waste-toner conveyance pipe 35 supplies the waste toner to the waste-toner container 23.

5. Mount Operation of Drum Cartridge onto Apparatus Main Body in a State where Toner Cartridge is Mounted on Drum Cartridge The mount operation of the drum cartridge 4 onto the apparatus main body 2 in a state where the toner cartridge 5 is mounted on the drum cartridge 4 will be described.

As shown in FIGS. 7 and 9, when the drum cartridge 4 (see FIG. 11) is mounted onto the apparatus main body 2 in a state where the toner cartridge 5 is mounted on the drum cartridge 4, the lever 33C contacts the part 100 of the apparatus main body 2, and thereby the second shutter 33 rotatably moves about the third axis A3 from the second closed position toward the second open position. Here, the protrusion 33B of the second shutter 33 fits into the hole 22B (see FIG. 4) of the first shutter 22, and thereby the first shutter 22 also rotatably moves together with the second shutter 33 from the first closed position toward the first open position.

In other words, the image forming apparatus 1 is configured such that, when the drum cartridge 4 is mounted onto the apparatus main body 2 in a state where the toner cartridge 5 is mounted on the drum cartridge 4, the first shutter 22 moves from the first closed position to the first open position and the second shutter 33 moves from the second closed position to the second open position.

When the drum cartridge 4 (see FIG. 11) is detached from the apparatus main body 2 in a state where the toner cartridge 5 is mounted on the drum cartridge 4, the second shutter 33 is pulled by the spring 34 (see FIG. 8) and rotatably moves about the third axis A3 from the second open position toward the second closed position. The first shutter 22 also rotatably moves together with the second shutter 33 from the first open position toward the first closed position.

In other words, the image forming apparatus 1 is configured such that, when the drum cartridge 4 is detached from the apparatus main body 2 in a state where the toner cartridge 5 is mounted on the drum cartridge 4, the first shutter 22 moves from the first open position to the first closed position and the second shutter 33 moves from the second open position to the second closed position.

6. Operations and Effects (1) As shown in FIGS. 7 and 10, in the image forming apparatus 1, when the drum cartridge 4 is mounted onto the apparatus main body 2 in a state where the toner cartridge 5 is mounted on the drum cartridge 4, the second shutter 33 moves from the second closed position (see FIG. 7) to the second open position (see FIG. 9). Here, the protrusion 33B of the second shutter 33 fits into the hole 22B of the first shutter 22, and thereby the first shutter 22 moves together with the second shutter 33 from the first closed position to the first open position.

When the drum cartridge 4 is detached from the apparatus main body 2 in a state where the toner cartridge 5 is mounted on the drum cartridge 4, the second shutter 33 is moved by the spring 34 (see FIG. 8) from the second open position to the second closed position. Here, the first shutter 22 moves together with the second shutter 33 from the first open position to the first closed position.

Consequently, in a configuration in which the first shutter 22 is provided at the toner cartridge 5 and the second shutter 33 is provided at the drum cartridge 4, when the toner cartridge 5 is detached from the drum cartridge 4, it is not necessary to perform an operation of closing the first shutter 22 and the second shutter 33, and the toner cartridge 5 is detached from the drum cartridge 4 with a single operation.

(2) As shown in FIG. 9, in the image forming apparatus 1, in a state where the toner cartridge 5 is mounted on the drum cartridge 4 and the drum cartridge 4 is mounted on the apparatus main body 2, the lever 33C is in contact with the part of the apparatus main body 2 so as to keep the second shutter 33 at the second open position.

In this way, with the simple configuration, in a state where the toner cartridge 5 is mounted on the drum cartridge 4 and the drum cartridge 4 is mounted on the apparatus main body 2, the second shutter 33 is kept at the second open position.

(3) As shown in FIG. 9, in the image forming apparatus 1, in a state where the toner cartridge 5 is mounted on the drum cartridge 4, at least part of the lever 33C is located at the opposite side from the first side plate 36A with respect to the second side plate 36B in the axial direction.

Thus, with the simple configuration, the part of the apparatus main body 2 is brought into contact with the lever 33C.

(4) As shown in FIG. 8, in the image forming apparatus 1, in a state where the drum cartridge 4 is detached from the apparatus main body 2, the spring 34 causes the second shutter 33 to be located at the second closed position.

Hence, when the drum cartridge 4 is detached from the apparatus main body 2, the spring 34 causes the second shutter 33 to be located at the second closed position without a user's operation of the second shutter 33.

(5) As shown in FIG. 11, in the image forming apparatus 1, in a state where the toner cartridge 5 is mounted on the drum cartridge 4, the reception port 32A and the discharge port 27 face each other in the first direction.

Hence, when the drum cartridge 4 is mounted onto the apparatus main body 2 in a state where the toner cartridge 5 is mounted on the drum cartridge 4, the second shutter 33 moves from the second closed position to the second open position and the first shutter 22 moves from the first closed position to the first open position in a state where the reception port 32A and the discharge port 27 face each other.

When the drum cartridge 4 is detached from the apparatus main body 2 in a state where the toner cartridge 5 is mounted on the drum cartridge 4, the second shutter 33 moves from the second open position to the second closed position and the first shutter 22 moves from the first open position to the first closed position in a state where the reception port 32A and the discharge port 27 face each other.

Consequently, the leakage of the toner is suppressed.

7. Second Embodiment

A second embodiment will be described while referring to FIGS. 13 to 16 wherein parts and components similar to those in the first embodiment are designated by the same reference numerals to avoid duplicating description.

7.1. Outline of Second Embodiment

Figure 13:
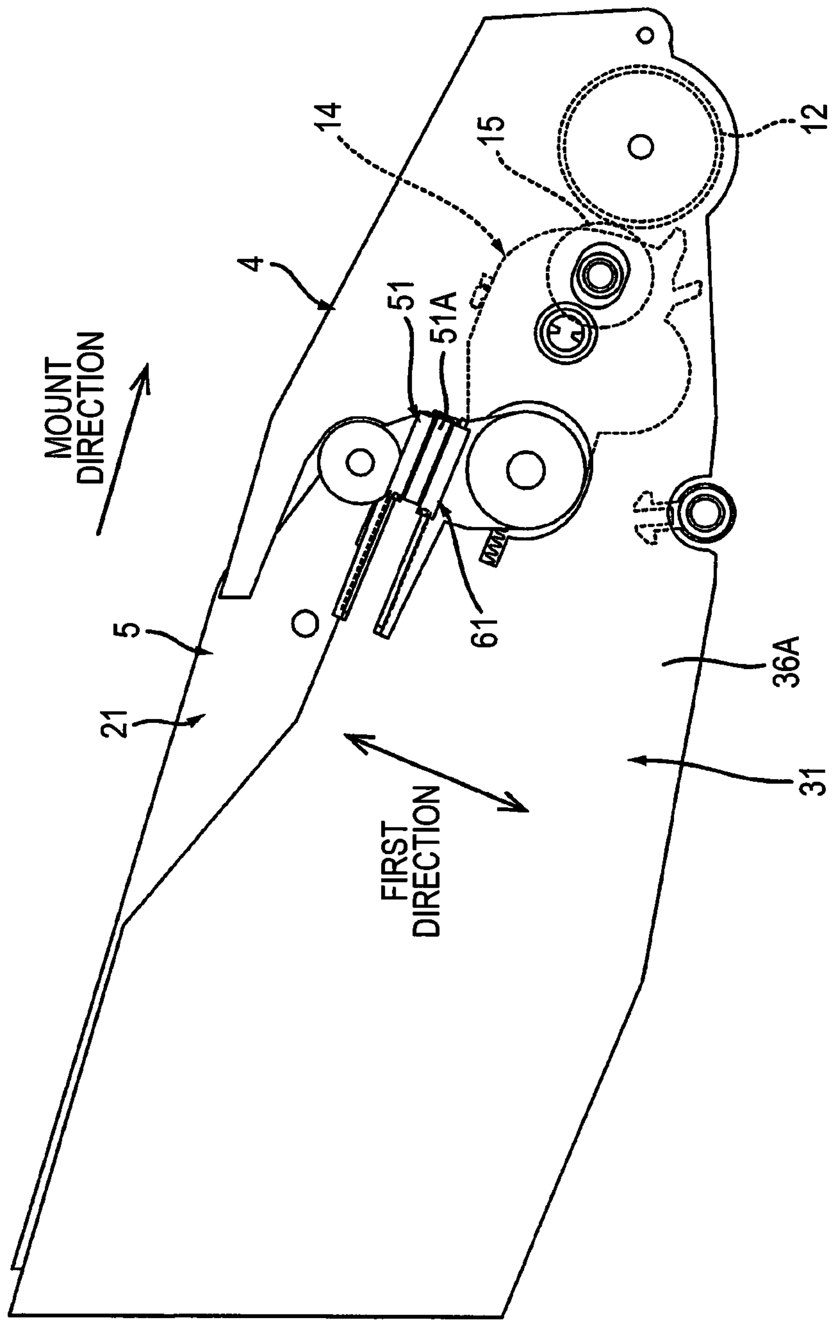
FIG. 13 is an explanatory diagram for illustrating movement of a first shutter and a second shutter in a second embodiment, and shows a state where the first shutter is located at a first closed position and the second shutter is located at a second closed position.
Figure 14:
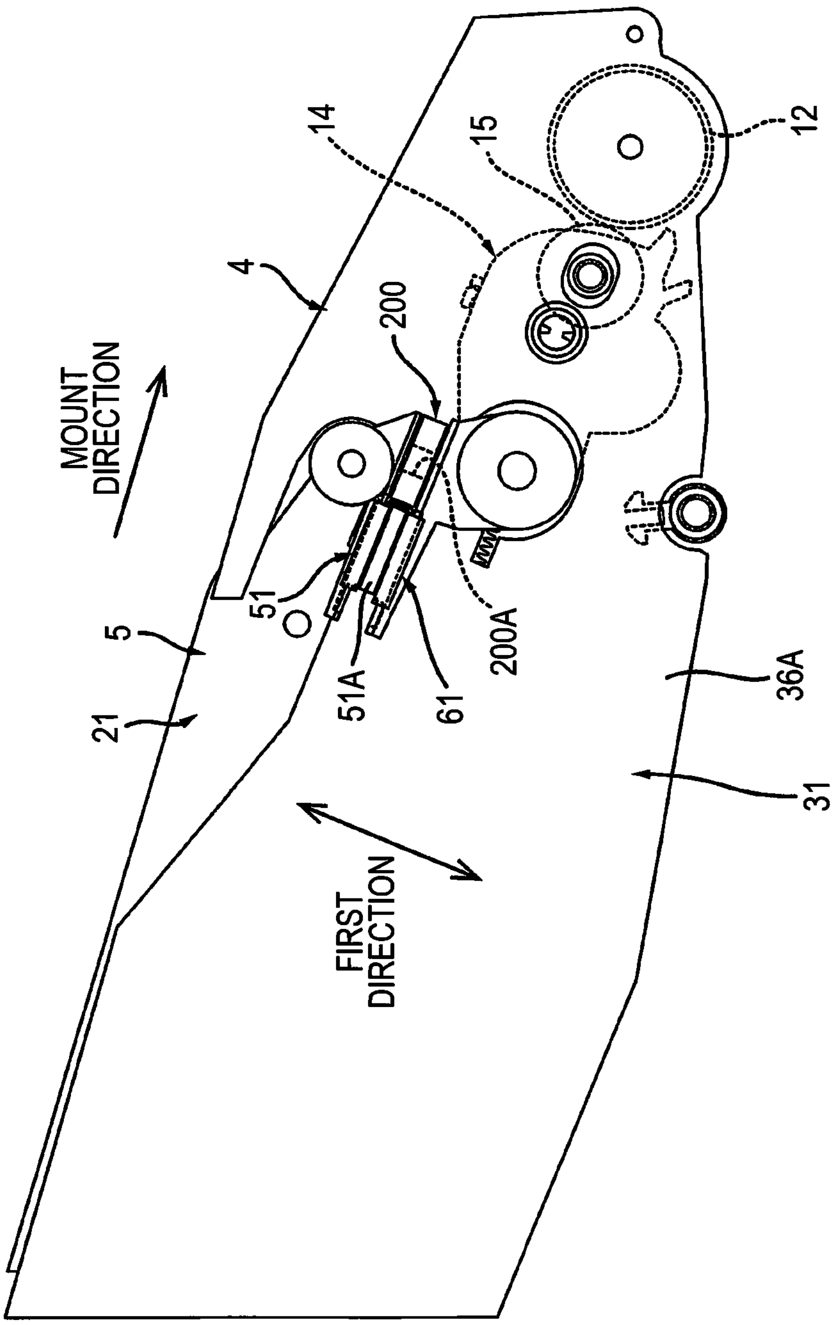
FIG. 14 is an explanatory diagram for illustrating, together with FIG. 13, movement of the first shutter and the second shutter in the second embodiment, and shows a state where the first shutter is located at a first open position and the second shutter is located at a second open position.

As shown in FIGS. 13 and 14, a first shutter 51 is configured such that, when the drum cartridge 4 is mounted onto the apparatus main body 2 in a state where the toner cartridge 5 is mounted on the drum cartridge 4, the first shutter 51 contacts a part 200 (see FIG. 14) of the apparatus main body 2 and moves from a first closed position (see FIG. 13) to a first open position (see FIG. 14).

A second shutter 61 is configured such that, when the drum cartridge 4 is mounted onto the apparatus main body 2 in a state where the toner cartridge 5 is mounted on the drum cartridge 4, the second shutter 61 contacts the part 200 (see FIG. 14) of the apparatus main body 2 and moves from a second closed position (see FIG. 13) to a second open position (see FIG. 14).

The part 200 of the apparatus main body 2 has an opening 200A. In a state where the toner cartridge 5 is mounted on the drum cartridge 4 and the drum cartridge 4 is mounted on the apparatus main body 2, the opening 200A is located between a discharge port 52 (see FIG. 15) and a reception port 62 (see FIG. 16). In other words, in a state where the toner cartridge 5 is mounted on the drum cartridge 4 and the drum cartridge 4 is mounted on the apparatus main body 2, the discharge port 52 and the reception port 62 communicate with each other through the opening 200A. With this configuration, the toner is supplied from the discharge port 52 to the reception port 62 through the opening 200A.

Figure 15:
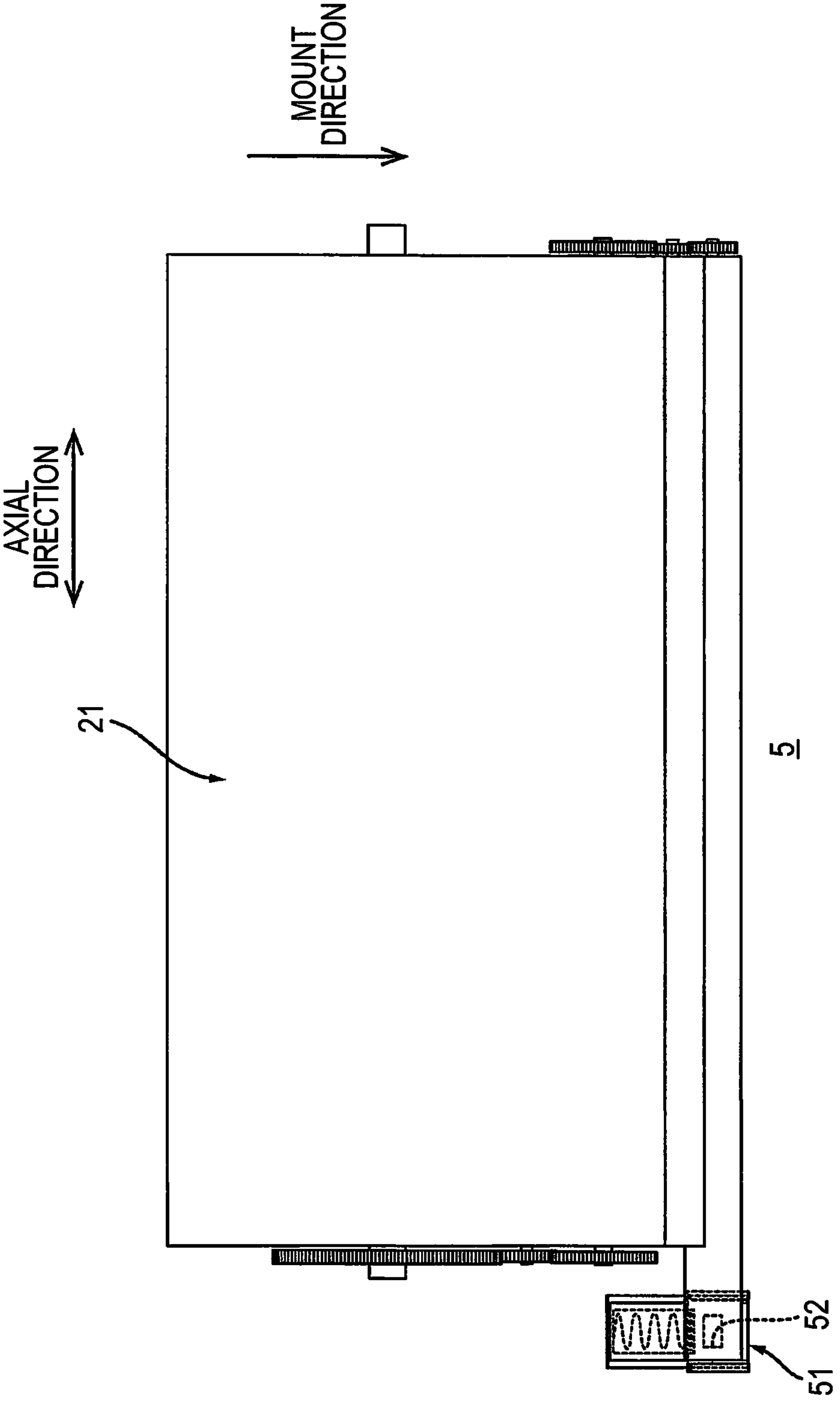
FIG. 15 is a plan view of a toner cartridge shown in FIG. 13.
Figure 16:
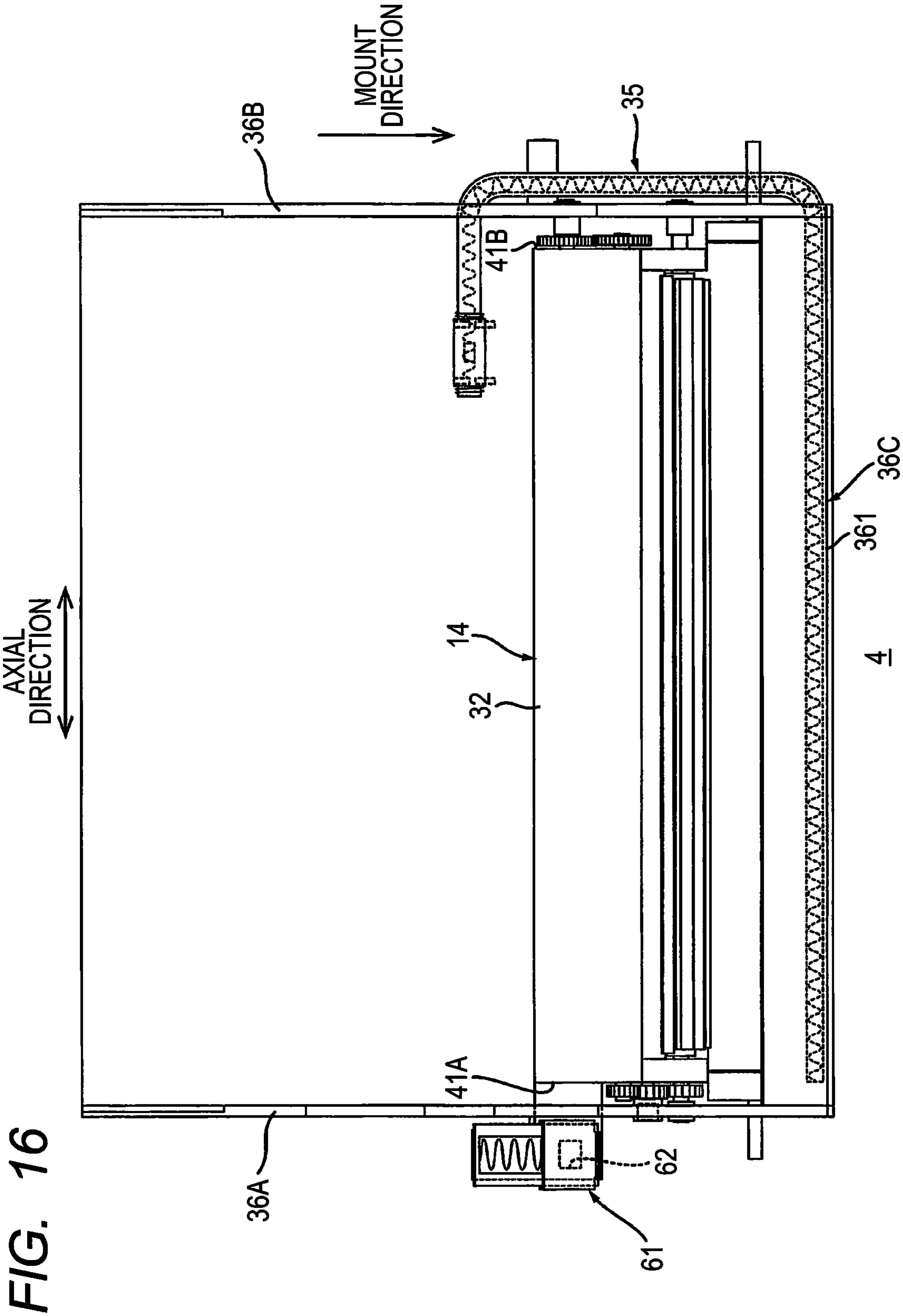
FIG. 16 is a plan view of a drum cartridge shown in FIG. 13.

As shown in FIG. 15, the discharge port 52 is located at one end portion of the toner cartridge 5 in the axial direction. As shown in FIG. 16, the reception port 62 is located at one end portion of the drum cartridge 4 in the axial direction. In a state where the toner cartridge 5 is mounted on the drum cartridge 4, the discharge port 52 and the reception port 62 overlap each other in a direction perpendicular to the mount direction, that is, the first direction. In a state where the toner cartridge 5 is mounted on the drum cartridge 4, the discharge port 52 and the reception port 62 are located at the opposite side from the second side plate 41B with respect to the first side plate 41A. In a state where the toner cartridge 5 is mounted on the drum cartridge 4, the discharge port 52 and the reception port 62 are located at the opposite side from the drum side plate 36B with respect to the drum side plate 36A.

The first shutter 51 and the second shutter 61 will be described below.

7.2. Details of First Shutter

As shown in FIGS. 13 and 14, the first shutter 51 moves between the first closed position and the first open position in the mount direction. Specifically, the first shutter 51 slidably moves between the first closed position and the first open position in the mount direction. The first shutter 51 has a flat-plate shape which extends in the mount direction. When the first shutter 51 is located at the first closed position, the first shutter 51 covers the discharge port 52 (see FIG. 15). When the first shutter 51 is located at the first open position, the first shutter 51 is separated from the discharge port 52 in the mount direction so as not to cover the discharge port 52. The first shutter 51 includes a sponge 51A. In a state where the toner cartridge 5 is mounted on the drum cartridge 4, the sponge 51A contacts the second shutter 61.

7.3. Details of Second Shutter

As shown in FIGS. 13 and 14, the second shutter 61 moves between the second closed position and the second open position in the mount direction. Specifically, the second shutter 61 slidably moves between the second closed position and the second open position in the mount direction. The second shutter 61 has a flat-plate shape which extends in the mount direction. When the second shutter 61 is located at the second closed position, the second shutter 61 covers the reception port 62 (see FIG. 16). When the second shutter 61 is located at the second open position, the second shutter 61 is separated from the reception port 62 in the mount direction so as not to cover the reception port 62.

As in the first shutter 22 and the second shutter 33 in the first embodiment, each of the first shutter 51 and the second shutter 61 in the second embodiment is urged toward the closed position by a spring. Thus, in a state where the toner cartridge 5 is mounted on the drum cartridge 4 and the drum cartridge 4 is detached from the apparatus main body 2, both the first shutter 51 and the second shutter 61 are located at the closed positions.

7.4. Effects of Second Embodiment

In the second embodiment, effects similar to those in the first embodiment are obtained.

While the disclosure has been described in detail with reference to the above aspects thereof, it would be apparent to those skilled in the art that various changes and modifications may be made therein without departing from the scope of the claims.

What is claimed is:

1. An image forming apparatus comprising:

an apparatus main body;

a drum cartridge attachable to the apparatus main body in a mount direction and detachable from the apparatus main body, the drum cartridge including:

a photosensitive drum rotatable about an axis extending in an axial direction perpendicular to the mount direction;

a drum frame; and a development housing including a development roller and supported by the drum frame, the development housing being movable relative to the photosensitive drum, the development housing having a reception port configured to receive toner;

a toner cartridge attachable to and detachable from the drum frame, the toner cartridge including a toner housing configured to contain toner, the toner housing including:

a first portion aligned with the development housing in the mount direction; and a second portion communicating with the first portion, the second portion being aligned with the development housing in a first direction perpendicular to both the mount direction and the axial direction, the second portion having a discharge port, the discharge port facing the reception port in the first direction and being configured to discharge toner toward the reception port; and a seal provided between the toner housing and the development housing, the seal surrounding the discharge port and the reception port.

2. The image forming apparatus according to claim 1, wherein the development housing is movable relative to the photosensitive drum in the mount direction.

3. The image forming apparatus according to claim 1, wherein the drum cartridge includes a first shutter movable between an open position at which the reception port is opened and a closed position at which the reception port is closed.

4. The image forming apparatus according to claim 1, wherein the toner cartridge includes a second shutter movable between an open position at which the discharge port is opened and a closed position at which the discharge port is closed.

5. The image forming apparatus according to claim 1, wherein the drum cartridge includes a first shutter movable between a first open position at which the reception port is opened and a first closed position at which the reception port is closed;

wherein the toner cartridge includes a second shutter movable between a second open position at which the discharge port is opened and a second closed position at which the discharge port is closed; and wherein the apparatus main body is configured to move the first shutter located at the first closed position to the first open position and to move the second shutter located at the second closed position to the second open position.

6. The image forming apparatus according to claim 5, wherein the first shutter and the second shutter move along the mount direction.

7. The image forming apparatus according to claim 1, wherein the development housing is located between the photosensitive drum and the first portion of the toner cartridge in the mount direction.

8. The image forming apparatus according to claim 1, wherein the drum frame extends in the mount direction from a first position to a second position, the first position being a position opposite to the photosensitive drum with respect to the development housing, the second position being a position of the photosensitive drum, the drum frame being configured to support the toner cartridge.

9. An image forming apparatus comprising:

an apparatus main body;

a drum cartridge attachable to the apparatus main body in a mount direction and detachable from the apparatus main body, the drum cartridge including:

a photosensitive drum rotatable about an axis extending in an axial direction perpendicular to the mount direction;

a drum frame; and a development housing including a development roller and supported by the drum frame, the development housing being movable relative to the photosensitive drum, the development housing having a reception port configured to receive toner; and a toner cartridge attachable to and detachable from the drum frame, the toner cartridge including a toner housing configured to contain toner, the toner housing including a discharge port and a first portion, the discharge port being configured to discharge toner toward the reception port, the first portion being aligned with the development housing in the mount direction, the drum frame extending in the mount direction from a first position to a second position, the first position being a position opposite to the photosensitive drum with respect to the development housing, the second position being a position of the photosensitive drum, the drum frame being configured to support the toner cartridge.

10. The image forming apparatus according to claim 9, wherein the development housing is located between the photosensitive drum and the first portion of the toner cartridge in the mount direction.

11. The image forming apparatus according to claim 9, wherein the toner housing includes a second portion aligned with the development housing in a first direction perpendicular to both the mount direction and the axial direction, the second portion having the discharge port; and wherein the reception port of the development housing and the discharge port of the toner housing face each other in the first direction.

12. The image forming apparatus according to claim 9, further comprising a seal provided between the toner housing and the development housing, the seal surrounding the discharge port and the reception port.

* * * * *